(12) United States Patent
Enomoto et al.

(10) Patent No.: US 10,093,796 B2
(45) Date of Patent: Oct. 9, 2018

(54) RESIN COMPOSITION AND MOLDED BODY

(71) Applicant: MIDORI ANZEN CO., LTD., Tokyo (JP)

(72) Inventors: Norihide Enomoto, Tokyo (JP); Tatsuya Hasegawa, Tokyo (JP); Taichi Ogawa, Tokyo (JP)

(73) Assignee: MIDORI ANZEN CO., LTD., Tokyo (JP)

( * ) Notice: Subject to any disclaimer, the term of this patent is extended or adjusted under 35 U.S.C. 154(b) by 79 days.

(21) Appl. No.: 14/355,783

(22) PCT Filed: Oct. 31, 2012

(86) PCT No.: PCT/JP2012/078173
§ 371 (c)(1),
(2) Date: May 1, 2014

(87) PCT Pub. No.: WO2013/065740
PCT Pub. Date: May 10, 2013

(65) Prior Publication Data
US 2014/0296422 A1  Oct. 2, 2014

(30) Foreign Application Priority Data
Nov. 1, 2011 (JP) ................. 2011-240415

(51) Int. Cl.
*C08L 67/02* (2006.01)
*C08L 69/00* (2006.01)
(Continued)

(52) U.S. Cl.
CPC .......... *C08L 67/02* (2013.01); *A42B 3/06* (2013.01)

(58) Field of Classification Search
USPC ....................................... 524/537
See application file for complete search history.

(56) References Cited

U.S. PATENT DOCUMENTS

2005/0131165 A1* 6/2005 Hale et al. ............. 525/462
2005/0137360 A1* 6/2005 Shaikh et al. ........... 525/462
(Continued)

FOREIGN PATENT DOCUMENTS

EP    188791      7/1986
JP    61-215652   9/1986
(Continued)

OTHER PUBLICATIONS

Extended European Search Report, Jun. 9, 2015; European Patent Application No. 12845069.9 (5 pages).

*Primary Examiner* — Ling Siu Choi
*Assistant Examiner* — Thuy-Al N Nguyen
(74) *Attorney, Agent, or Firm* — Hamre, Schumann, Mueller & Larson, P.C.

(57) ABSTRACT

Provided is a resin composition having weather resistance and low-temperature impact resistance, which are the problems of a poly(1,4-cyclohexylene dimethylene terephthalate) copolyester resin, and sustaining the chemical resistance and room-temperature impact resistance of poly(1,4-cyclohexylene dimethylene terephthalate) copolyester resin. It is a resin composition containing a poly(1,4-cyclohexylene dimethylene terephthalate) copolyester resin and a polycarbonate resin, in which the poly(1,4-cyclohexylene dimethylene terephthalate) copolyester resin is contained at 60 to 95% by weight and the polycarbonate resin is contained at 5 to 40% by weight.

2 Claims, 11 Drawing Sheets

(51) Int. Cl.
*B32B 15/09* (2006.01)
*B29C 45/18* (2006.01)
*A42B 3/06* (2006.01)

(56) References Cited

U.S. PATENT DOCUMENTS

| | | |
|---|---|---|
| 2006/0287474 A1 | 12/2006 | Dudley et al. |
| 2007/0276065 A1* | 11/2007 | Barton .................. C08G 63/199 524/132 |
| 2009/0130355 A1* | 5/2009 | Chen ....................... B32B 27/32 428/36.6 |
| 2010/0087574 A1 | 4/2010 | Dudley et al. |
| 2011/0060084 A1 | 3/2011 | Jung et al. |

FOREIGN PATENT DOCUMENTS

| | | |
|---|---|---|
| JP | 10-182960 | 7/1998 |
| JP | 11-512484 | 10/1999 |
| JP | 2000-143951 | 5/2000 |
| JP | 2001-81209 | 3/2001 |
| JP | 2002-294060 | 10/2002 |
| JP | 2003-049316 | 2/2003 |
| JP | 3432830 B | 8/2003 |
| JP | 2005-220343 | 8/2005 |
| JP | 2007-210138 | 8/2007 |
| JP | 3973303 B | 9/2007 |
| JP | 2008-519130 | 6/2008 |
| JP | 2009-513792 | 4/2009 |
| JP | 2010-507716 | 3/2010 |
| WO | WO 97/011106 | 3/1997 |
| WO | WO 2005/090049 | 9/2005 |
| WO | WO 2010/101562 | 9/2010 |

* cited by examiner

TEST SPECIMEN (DUMBBELL-SHAPED)

TENSILE TESTER

BENDING PROPERTY TESTER

LOAD DEFLECTION TEMPERATURE (HDT) TESTER

ENVIRONMENTAL STRESS CRACK TESTER (a) INSTALLMENT OF TEST SPECIMEN (b) ADHESION OF CHEMICALS

RESIN COMPOSITION AND MOLDED BODY

TECHNICAL FIELD

The present invention relates to a resin composition and a molded body. Specifically, the present invention relates to a novel resin composition which is capable of solving the problem of lacking weather resistance and low-temperature impact resistance, which has been considered as an intrinsic problem, and of maintaining the excellent chemical resistance of a poly(1,4-cyclohexylene dimethylene terephthalate) copolyester resin, more specifically, a copolyester resin containing dimethyl terephthalate (DMT) as an acid component and 1,4-cyclohexane dimethanol (CHDM) and 2,2,4,4-tetramethyl-cyclobutan diol (TMCD) as a glycol component.

BACKGROUND ART

Inventors of the present invention extensively study for developing a helmet (Patent Literature 1: WO 2005/090049). As a material of a helmet, a polycarbonate resin or the like is widely used from the viewpoint of having high mechanical strength and high heat resistance. A helmet added with a face protection shield made of a polycarbonate resin is also widely known (Patent Literature 2: JP 2003-049316 A). Without being limited to a helmet, the polycarbonate resin is widely used as a material for other components from the viewpoint of its excellent transparency, impact resistance, heat resistance, and easy processability.

By performing an anti-fog treatment process for applying a coating, an anti-fog film laminate or the like onto a surface of a polycarbonate resin prepared as a product, a molded body of a polycarbonate resin is provided. By having such means, it is prepared to withstand for a general use. Also in the field of the inventors' interest, such means can be used for a helmet, a face protection shield of a helmet, a sports goggle, or eyeglasses.

The anti-fog treatment includes a method of preventing fogginess with a water film, which is formed by coating with a surfactant or hydrophilization of a surface layer and a method of using a water-absorbing water-absorption layer for preventing fogginess using a water absorption layer, which is formed on a surface layer. When it is used under conditions not always having high humidity such as a face protection shield of a helmet or a sports goggle, the anti-fog treatment based on a water-absorbing water-absorption layer is used. It has been noted that the polycarbonate resin substrate obtained by the anti-fog treatment based on a water-absorbing water-absorption layer has white turbidity and peeling of a layer with anti-fog treatment, due to low chemical resistance as a property of a polycarbonate resin (Patent Literature 3: JP 2007-210138 A). Due to the intrinsically low chemical resistance of a polycarbonate substrate, when a water-absorbing water-absorption layer is adopted in the presence of water, the polycarbonate substrate is in a state which is likely to have a problem. Sometimes, there may be a breakage. Thus, it leads to the conclusion that preparing a material with chemical resistance by performing a surface treatment of the polycarbonate resin is not feasible. With regard to a means for solving this problem, it is found that the basic solution cannot be provided without altering the properties of a polycarbonate resin to properties of a resin with chemical resistance.

The polycarbonate is usually considered as a favorable resin. Studies have been made to improve the properties of a polycarbonate resin based on it. As one method, it has been tried to perform polymer alloying by using a polycarbonate resin and other resin to improve the properties of a polycarbonate resin. However, with regard to the problem of low chemical resistance of a polycarbonate resin, obtaining newly a resin composition with chemical resistance by performing polymer alloying and modifying helmet materials by using it have not been tried until now.

Based on the technical background described above, problems of a polycarbonate resin which are not necessarily known are examined and the determination is made to obtain, by polymer alloying, a novel resin composition having chemical resistance by improving the low chemical resistance, which is considered as a problem of a polycarbonate resin.

A thermoplastic resin composition consisting of a polycarbonate resin and a polyester resin (as a representative polyester, polyethylene terephthalates are considered) are considered to be a material having both the impact resistance originally owned by a polycarbonate resin and the chemical resistance owned by the polyethylene terephthalates. Further, it is widely used in an automobile, a field of OA, or the like. Although it is expected to solve the problems by using a thermoplastic resin composition consisting of polyethylene terephthalates and a polycarbonate resin that is produced by a specific method, it has not been achieved yet.

According to the resin composition of the related art in which a polycarbonate resin and a polyester resin are combined, the impact resistance of a polycarbonate resin itself may be significantly lowered and also the chemical resistance of a polyester resin itself may not be sufficiently obtained. Further, since such resin composition is often a non-transparent resin, it is not suitable for a transparent material.

The polycarbonate resin having excellent impact resistance is believed to have poor melt viscosity stability, wet heat fatigue property, and chemical resistance. It is believed that producing a novel resin composition by polymer alloying of polyethylene terephthalates with good chemical resistance and wet heat fatigue property and a polycarbonate resin enables an improvement of the physical properties. However, a resin composition of polyethylene terephthalates using ethylene glycol as an aliphatic glycol shows a significantly lowered hinge properties and lowered wet heat fatigue resistance in repeated bending to yield a case exhibiting breakage of a molded body, which may be due to a progress of crystallization of polyethylene terephthalates and hydrolysis of a polycarbonate resin after exposure to a high temperature and high humidity condition for a long period of time, and as a result, it is believed that no success has been made yet.

For such reasons, it is considered that, in a field requiring mechanical strength, chemical resistance, or a wet heat fatigue property, for example, a material satisfying the requirement for use as an outer handle or an inner door handle as an automobile component, or a mechanical component like a cover of an electric power tool has not been obtained yet. Examination is made regarding the following invention for obtaining a thermoplastic resin composition with excellent melt viscosity stability, wet heat fatigue property, or the like while maintaining the impact resistance and chemical resistance originally owned by the polycarbonate resin and polyalkylene terephthalates.

A suggestion has been made regarding a "thermoplastic resin composition consisting of 5 to 95 parts by weight of polycarbonate (A), in which the main repeat unit is represented by the formula (1) (omitted), and 95 to 5 parts by weight of polyester (BT), in which the main repeat unit is represented by the formula (2) (omitted), and having melt viscosity stability of 2.5% or less (Patent Literature 4: JP 2002-294060 A, Patent Literature 5: JP 2000-143951 A, and JP 3973303 B1).

With regard to a solution for the above problem, when the polycarbonate component is used in a large amount, an influence of the polycarbonate becomes higher, and as a result, it is unavoidable to have a product having undesirable properties of polycarbonate. The polycarbonate as a material used for a helmet or the like is left to have a result of having low chemical resistance, which is an undesirable property of the polycarbonate.

Accordingly, for improving the chemical resistance not owned by a polycarbonate resin, it is considered to stop using a polycarbonate resin as a resin for substrate, but use a resin having chemical resistance as a substrate and perform polymer alloying in combination with other resin.

If the polyester resin is used for a helmet material, there is an improvement in terms of chemical resistance, which is problematic in the polycarbonate resin. However, as it is insufficient in terms of weather resistance and low-temperature impact resistance, improvements are needed therefor. Because the inventors of the present invention knew from experience that, even for a case of using a polyester resin, use of a polyester resin of the relate art is not sufficient in terms of the properties but use of poly(1,4-cyclohexylene dimethylene terephthalate)copolyester (Patent Literature 6: JP 3432830 B1 and JP 11 512484 W) is effective. As such, use of poly(1,4-cyclohexylene dimethylene terephthalate) copolyester resin is taken as a measure for solving the problems.

It is urgently needed to obtain a resin having weather resistance and low-temperature impact resistance, which are regarded as a problem of a poly(1,4-cyclohexylene dimethylene terephthalate) copolyester resin, by performing polymer alloying using a resin composition in which a poly(1,4-cyclohexylene dimethylene terephthalate) copolyester resin is combined with other resin, and also to obtain a resin composition maintaining the chemical resistance and impact resistance at room temperature that are originally owned by the poly(1,4-cyclohexylene dimethylene terephthalate) copolyester resin.

In Patent Literature 7, a molded body having 5 to 95% by weight of a polyester consisting of a terephthalic acid residue, a 2,2,4,4-tetramethyl-1,3-cyclobutane diol residue, and a cyclohexane dimethanol residue and 5 to 95% by weight of polycarbonate is suggested. However, the molded body does not have an improvement in low-temperature impact resistance. Further, there is no improvement of chemical resistance depending on the nature of the composition. Still further, there is no improvement of weather resistance.

CITATION LIST

Patent Literature

Patent Literature 1: Japanese Patent Application Re-publication No. 2005/090049
Patent Literature 2: JP 2003-049316 A
Patent Literature 3: JP 2007-210138 A
Patent Literature 4: JP 2002-294060 A
Patent Literature 5: JP 2000-143951 A, JP 3973303 B1
Patent Literature 6: JP 3432830 B1, JP 11-506847 W
Patent Literature 7: WO 2010/101562 A

SUMMARY OF INVENTION

Technical Problem

A first problem to be solved by the present invention is to provide a novel resin composition having weather resistance and low-temperature impact resistance, which are the problems of a poly(1,4-cyclohexylene dimethylene terephthalate) copolyester resin, and maintaining simultaneously the chemical resistance and impact resistance at room temperature owned by the poly(1,4-cyclohexylene dimethylene terephthalate) copolyester by adding other resin to the poly(1,4-cyclohexylene dimethylene terephthalate) copolyester resin followed by polymer alloying to give the resin composition.

A second problem to be solved by the present invention is to provide a novel resin composition having weather resistance and low-temperature impact resistance, which are the problems of a poly(1,4-cyclohexylene dimethylene terephthalate) copolyester resin, and maintaining simultaneously the chemical resistance and impact resistance at room temperature owned by the poly(1,4-cyclohexylene dimethylene terephthalate) copolyester by having a resin composition in which a UV absorbing agent and/or a hydrolysis inhibitor capable of providing weather resistance to the poly(1,4-cyclohexylene dimethylene terephthalate) copolyester resin and the aforementioned resin are added.

A third problem to be solved by the present invention is to provide, by using the novel resin composition obtained from above, a helmet cap body having not only the weather resistance and low-temperature impact resistance but also the properties of maintaining chemical resistance and impact resistance at room temperature, which are the characteristics not found in a helmet of the related art.

A fourth problem to be solved by the present invention is to provide, by using the novel resin composition obtained from above, a face protection shield of a helmet having not only the weather resistance and low-temperature impact resistance but also the properties of maintaining chemical resistance and impact resistance at room temperature.

A fifth problem to be solved by the present invention is to provide, by using the novel resin composition obtained from above, a sports goggle, a lens for eyeglasses, or an integrated combination of a lens for eyeglasses and eyeglasses having not only the weather resistance and low-temperature impact resistance but also the properties of maintaining chemical resistance and impact resistance at room temperature.

A sixth problem to be solved by the present invention is to provide, by using the novel resin composition obtained from above, an outer handle, an inner door handle, or a mechanical component such as a cover of an electric power tool or resin glazing member having not only the weather resistance and low-temperature impact resistance but also the properties of maintaining chemical resistance and impact resistance at room temperature.

A seventh problem to be solved by the present invention is to provide, by using the novel resin composition obtained from above, an exterior resin member for outdoor use having not only the weather resistance and low-temperature impact resistance but also the properties of maintaining chemical resistance and impact resistance at room temperature.

Solution to Problem

One aspect of the present invention is a resin composition containing a poly(1,4-cyclohexylene dimethylene terephthalate) copolyester resin and a polycarbonate resin, in which the poly(1,4-cyclohexylene dimethylene terephthalate) copolyester resin is contained at 60% by weight to 95% by weight and the polycarbonate resin is contained at 5% by weight to 40% by weight.

Another aspect of the present invention is a resin composition containing a poly(1,4-cyclohexylene dimethylene terephthalate) copolyester resin and a polycarbonate resin, in which the poly(1,4-cyclohexylene dimethylene terephthalate) copolyester resin is contained at 60% by weight to 95% by weight, the polycarbonate resin is contained at 5% by weight to 40% by weight, a melt viscosity ratio between the poly(1,4-cyclohexylene dimethylene terephthalate) copolyester resin and the polycarbonate resin ((melt viscosity of polycarbonate resin)/(melt viscosity of poly(1,4-cyclohexylene dimethylene terephthalate) copolyester resin)) is 2.0 or more at 280° C. and a shear rate of 10 ($sec^{-1}$), and an MFR value (300° C., 1.2 kg) of the polycarbonate resin is less than 15 g/10 min.

One example of the resin composition is a copolyester resin in which the poly(1,4-cyclohexylene dimethylene terephthalate) copolyester resin contains dimethyl terephthalate (DMT) as an acid component and 1,4-cyclohexane dimethanol (CHDM) and 2,2,4,4-tetramethyl-cyclobutan diol (TMCD) as a glycol component.

One example of the resin composition further contains a UV absorbing agent and/or a hydrolysis inhibitor, in which the total of the UV absorbing agent and the hydrolysis inhibitor 0.1 to 6.0 parts by weight per 100 parts by weight of the poly(1,4-cyclohexylene dimethylene terephthalate) copolyester resin and the polycarbonate resin in total.

Another aspect of the present invention is a molded body composed of the resin composition, in which a content of the poly(1,4-cyclohexylene dimethylene terephthalate) copolyester resin per the polycarbonate resin is higher in a surface layer than an average value of the molded body as a whole.

Still another aspect of the present invention is an exterior resin member for outdoor use, a helmet cap body, a face protection shield of a helmet, a sports goggle, a lens for eyeglasses, a lens for eyeglasses, a temple, and a frame of eyeglasses, an outer handle, an inner door handle, a mechanical component, a cover of an electric power tool, or a resin glazing member, which is composed of the resin composition described above.

Figure 1:
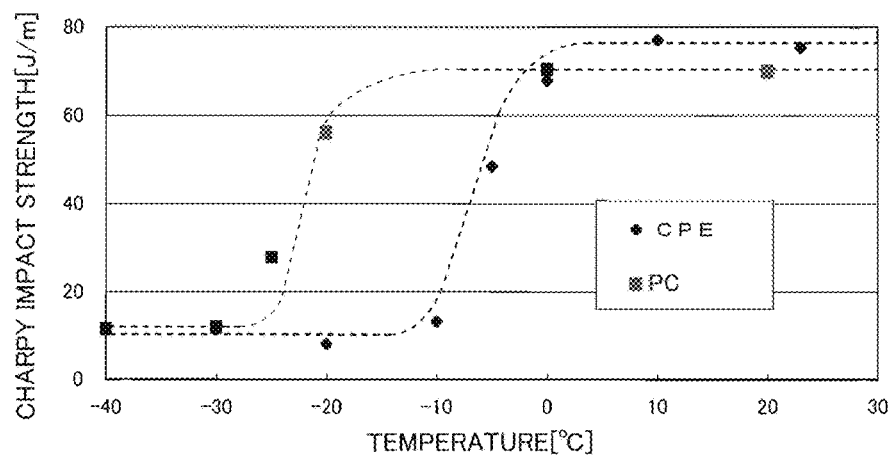
FIG. 1 is a diagram illustrating a change in measurement results of Charpy impact strength of CPE (poly(1,4-cyclohexylene dimethylene terephthalate) copolyester resin) and PC (polycarbonate resin) with respect to a change in temperature.

MODE FOR CARRYING OUT THE INVENTION (1) The means for solving the aforementioned problem of the present invention is to have a novel resin composition by specifying other resin subjected to polymer alloying with a copolyester resin containing a poly(1,4-cyclohexylene dimethylene terephthalate) copolyester resin, for example, a copolyester resin containing dimethyl terephthalate (DMT) as an acid component and 1,4-cyclohexane dimethanol (CHDM) and 2,2,4,4-tetramethyl-cyclobutan diol (TMCD) as a glycol component (hereinbelow, it may be cited similarly as an example), to solve the problems relating to low weather resistance and low-temperature impact resistance that are remained to be problems as properties of a poly(1,4-cyclohexylene dimethylene terephthalate) copolyester resin, and to obtain a resin composition having a property of maintaining the chemical resistance and impact resistance at room temperature originally owned by the poly(1,4-cyclohexylene dimethylene terephthalate) copolyester. The poly (1,4-cyclohexylene dimethylene terephthalate) copolyester resin is problematic in that it has low weather resistance. For such reasons, it is desired to have a property of providing weather resistance and preventing at the same time the significant decrease in impact strength at low temperature (approximately, −10° C. or lower).

(2) Examination is made regarding selecting the other resin to be combined with the poly(1,4-cyclohexylene dimethylene terephthalate) copolyester resin.

Because the poly(1,4-cyclohexylene dimethylene terephthalate) copolyester resin has a chemical resistance, the other resin to be combined is not required to have a special property relating to chemical resistance. Further, because the poly(1,4-cyclohexylene dimethylene terephthalate) copolyester resin has low weather resistance and low-temperature impact strength, it is desired to have a resin capable of supplementing those properties. In summary, a special property relating to chemical resistance is not necessary but it is desired to have a sufficient property of weather resistance and low-temperature impact strength. It was found that, as a specific resin of the other resin, a polycarbonate resin is suitable. As a result, it was concluded that, with a product obtained by adopting the means of polymer alloying of a composition consisting of a poly(1,4-cyclohexylene dimethylene terephthalate) copolyester resin and a polycarbonate resin, a product capable of solving the problems of the related art can be obtained.

(3) For application of the means of polymer alloying, handling as follow is preferable.

"For preparing a two-phase solid polymer composition in which two kinds of a polymer consist of a mixture of two kinds of a polymer, a polymer composition exhibiting a monophase and having a single glass transition temperature is prepared from the above polymer mixture, the monophase composition is heated at a first temperature higher than the glass transition temperature to give a intercommunicating two-phase material having two glass transition temperatures, the temperature of the two-phase material is lowered to a second temperature, which is lower than the lower temperature of the two glass transition temperatures, and thus a polymer alloy composition having an intercommunicating structural shape based on a spinodal decomposition for substantial stabilization of the two-phase shape of the material is prepared" (JP 3-20333 A).

Further, as a result of intensive studies for providing a structural material having an excellent mechanical property or a functional material having excellent regularity, after forming a specific structure period at initial stage by using the spinodal decomposition in polymer alloying, a structure control for having a two-phase continuous structure with a structure period of 0.01 to 1 μm or a dispersion structure in which a center distance between dispersion particles is 0.01 to 1 μm is also performed (JP 4172220 B).

(4) With regard to the above item (2) invented by the inventors of the present invention, it was found by the inventors that, when the polymer alloying is performed with a poly(1,4-cyclohexylene dimethylene terephthalate) copolyester resin and a polycarbonate resin, both have a compatibility allowing dissolution in each other, unlike the item (3) above. As a result, it was found that the polymer alloying can be achieved by kneading and extrusion of them after melting without performing the spinodal decomposition of the above (3).

(5) Based on the findings above, the present invention was completed with determination of conditions.

It is a resin composition containing a poly(1,4-cyclohexylene dimethylene terephthalate) copolyester resin and a polycarbonate resin, in which the poly(1,4-cyclohexylene dimethylene terephthalate) copolyester resin is contained at 60% by weight to 95% by weight and the polycarbonate resin is contained at 5% by weight to 40% by weight.

(6) The inventors of the present invention succeeded in converting into a resin having weather resistance, which is a problem of a poly(1,4-cyclohexylene dimethylene terephthalate) copolyester resin, by adding a UV absorbing agent and/or a hydrolysis inhibitor to the poly(1,4-cyclohexylene dimethylene terephthalate) copolyester resin. By utilizing this success, it is found to be possible to obtain a resin composition containing 60% by weight to 95% by weight of a poly(1,4-cyclohexylene dimethylene terephthalate) copolyester resin and 5% by weight to 40% by weight of a polycarbonate resin (100 parts by weight in total), and 0.1 to 6.0 parts by weight of a UV absorbing agent and/or a hydrolysis inhibitor in total relative to 100 parts by weight of the resins.

(7) A helmet cap body, a face protection shield of a helmet, a sports goggle, a lens for eyeglasses, a lens for eyeglasses, a temple, and a frame of eyeglasses, an outer handle, an inner door handle, a mechanical component, a cover of an electric power tool, an exterior resin member for outdoor use a resin glazing member, or the like, in which the novel resin composition obtained by polymer alloying is used, can be obtained.

Hereinbelow, embodiments of the present invention are described.

First Embodiment

One embodiment of the present invention is a resin composition containing a poly(1,4-cyclohexylene dimethylene terephthalate) copolyester resin and a polycarbonate resin, in which the poly(1,4-cyclohexylene dimethylene terephthalate) copolyester resin is contained at 60% by weight to 95% by weight and the polycarbonate resin is contained at 5% by weight to 40% by weight.

The resin composition according to the present invention uses the poly(1,4-cyclohexylene dimethylene terephthalate) copolyester resin at 60 to 95% by weight. The value may be, for example, 65% by weight or more, 70% by weight or more, or 75% by weight or more. It may be also 90% by weight or less, 85% by weight or less, or 80% by weight or less.

Further, the polycarbonate resin used at 5 to 40% by weight. The value may be, for example, 10% by weight or more, 15% by weight or more, or 20% by weight or more. It may be also 35% by weight or less, 30% by weight or less, or 25% by weight or less.

The resin composition may consist of the poly(1,4-cyclohexylene dimethylene terephthalate) copolyester resin and polycarbonate resin only. Further, within a range in which it does not inhibit the effect of the present invention, the other resin component may be also contained. Further, an optional additive may be contained.

By improving the property of having low weather resistance and low-temperature impact resistance, which has been remained as a problem of the poly(1,4-cyclohexylene dimethylene terephthalate) copolyester resin, a novel resin composition having excellent weather resistance and low-temperature impact resistance and also maintaining the chemical resistance and impact resistance at room temperature of the poly(1,4-cyclohexylene dimethylene terephthalate) copolyester can be obtained.

Further, the resin composition of the present invention can maintain the excellent chemical resistance of the poly(1,4-cyclohexylene dimethylene terephthalate) copolyester itself and also transparency. Accordingly, a wide application to a transparent material can be made.

With the poly(1,4-cyclohexylene dimethylene terephthalate) copolyester resin only, the impact property is dramatically lowered near at −10° C. However, with the resin composition of the present invention, the impact strength at −10° C., which is a test standard of Labor Safety and Hygiene Act of an industrial helmet, can be maintained. Further, the resin composition according to the present invention can be used as an industrially safe material from the viewpoint of the low-temperature impact resistance and chemical resistance, in particular.

By using "TRITAN TX2000" manufactured by Eastman Chemical Company as a poly(1,4-cyclohexylene dimethylene terephthalate) copolyester resin and "S2000UR" manufactured by Mitsubishi Engineering-Plastics Corporation as a polycarbonate resin, test specimens each with a thickness of 4 mm and a notch of 2 mm were prepared. Then, the change in the measurement result of Charpy impact strength of the test specimen per temperature was measured. The results are shown in FIG. 1. In FIG. 1, the result shown at the top right indicates the result using the poly(1,4-cyclohexylene dimethylene terephthalate) copolyester resin (designated as CPE in the diagram) and the result shown below indicates the result using the polycarbonate resin (designated as PC in the diagram).

According to FIG. 1, it is shown that the Charpy impact strength of TRITAN has dramatically decreased between −5° C. and −10° C. Below the temperature, the low-temperature impact resistance was lowered. Meanwhile, it is shown that the Charpy impact strength of the polycarbonate resin has dramatically decreased between −15° C. and −25° C. It is found that the polycarbonate resin does not have low-temperature impact strength as low as TRITAN between −5° C. and −10° C. but has decreased low-temperature impact strength between −15° C. and −25° C.

By combining the poly(1,4-cyclohexylene dimethylene terephthalate) copolyester resin with a polycarbonate resin, the weather resistance and low-temperature impact resistance remained as a problem of the poly(1,4-cyclohexylene dimethylene terephthalate) copolyester resin are improved, and therefore a novel resin composition maintaining chemical resistance and impact resistance at room temperature of the poly(1,4-cyclohexylene dimethylene terephthalate) copolyester resin can be provided. That is, a resin composition in which desirable properties of the poly(1,4-cyclohexylene dimethylene terephthalate) copolyester resin and the polycarbonate resin are combined can be obtained. It relates to a result showing the effectiveness of the polycarbonate resin as a resin to be selected for combination with the poly(1,4-cyclohexylene dimethylene terephthalate) copolyester resin for performing polymer alloying.

The results obtained by performing each test for the test specimens in which TRITAN "TX1001" (TRITAN of general grade for injection, manufactured by Eastman Chemical Company) as a poly(1,4-cyclohexylene dimethylene terephthalate) copolyester resin is varied from 100% by weight to 70% by weight and PC "E2000UR" (general grade for extrusion, polycarbonate) is varied from 0 to 30% by weight as a polycarbonate resin are described with reference to Table 1 of the examples that are described below.

In Table 1, results for the test items of specific gravity measurement, HDT measurement, transmittance, tensile test (tensile modulus, yield stress, deformation at yield point, stress at the break point, and deformation at the break point), bending test (bending modulus, yield stress, and yield deformation), and Charpy impact strength.

Based on the results, it was found to be preferable that TRITAN "TX1001" (TRITAN of general grade for injection) is in the range of 70% by weight to 90% by weight and PC "E2000UR" (general grade for extrusion, polycarbonate) is in the range of 10% by weight to 30% by weight.

In Table 1, the results obtained from a case in which the UV absorbing agent (CYASORB UV-3638 manufactured by Cytec Company) and hydrolysis inhibitor (LA-1, CARBODILITE, manufactured by Nisshinbo Chemical Inc.) are co-present at 0.5% by weight to 0.25% by weight, respectively, compared to 100% by weight of TRITAN "TX1001" and PC "E2000UR" in total are also shown. Further, the results obtained from a case of adding a white coloring agent are also shown. A sufficient effect was also confirmed from those cases.

With regard to the results of Table 1, the following points can be noted.

(1) Improved Physical Properties at Low Temperature

As the ratio of the polycarbonate resin increases, higher results of the yield stress, deformation at yield point, stress at the break point, and deformation at the break point were obtained according to the tensile test at 10° C. and −15° C. Physical properties at low temperature like them have a higher value as the ratio of the polycarbonate increases.

(2) Results of Bending Test

As the ratio of the polycarbonate increases, higher values of the bending modulus, yield stress, and yield deformation were measured.

(3) with Regard to Results of HDT Measurement

As the ratio of the polycarbonate resin increases, higher HDT values were measured.

(4) with Regard to Measurement Results of Visual Transmittance Among Transmittances As the ratio of the polycarbonate resin increases, higher transmittance values were measured from all cases.

(5) with Regard to Measurement Results of Wavelength for Having 1% Increase in UV Rays Among Transmittances As the ratio of the polycarbonate resin increases, higher values of the wavelength for having 1% increase in UV rays were measured.

The visual transmittance is very high for the test specimen without coloration. As a performance required for protective eyewear, in JIS T8147, the visual transmittance is set at 85% or higher. A resin consisting of a poly(1,4-cyclohexylene dimethylene terephthalate) copolyester resin (hereinbelow, it may be simply referred to as "CPE") and PC satisfies the visual transmittance of 85% or higher. Further, even a resin containing a UV absorbing agent and a hydrolysis inhibitor in a mixture consisting of CPE and PC satisfies the visual transmittance of 85% or higher. From this point of view, it is found that the resin composition of the present invention can be used not only for a protective eyeglasses but also for a substitute resin material for a common lens for eyeglasses, disaster preventing surface, an optical lens, a glass or the like that are required to have high transmittance.

The resin consisting of CPE and PC has a higher wavelength for having 1% increase in UV rays than CPE only. The resin containing a UV absorbing agent and a hydrolysis inhibitor in a mixture consisting of CPE and PC has an even higher value. UV rays with a wavelength of 400 nm or lower are generally regarded to be harmful to an eye. A high value of the wavelength for having 1% increase in UV rays leads to blocking of more UV rays, and thus when used for protective eyewear or a common eyeglasses, it is recognized that the performance of protecting an eye from UV rays is high.

With regard to the results of performing each test for the test specimen in which TRITAN "TX1000" (TRITAN of general grade, manufactured by Eastman Chemical Company) as a poly(1,4-cyclohexylene dimethylene terephthalate) copolyester resin is varied from 100% by weight to 50% by weight and polycarbonate "302-4" (standard grade, manufactured by Sumika Styron Polycarbonate Limited) as a polycarbonate resin is varied from 0 to 50% by weight, the descriptions are given with reference to Table 3 of Examples that are described below.

In Table 3, the results of the planar impact test (room temperature 23° C. and low temperature of −10° C.) and chemical resistance test as a test item are shown.

Based on the results, having the poly(1,4-cyclohexylene dimethylene terephthalate) copolyester resin in the range of 95% by weight to 60% by weight and the polycarbonate resin in the range of 5% by weight to 40% by weight (100% by weight in total) is suitable.

From the results of Table 3, the following points can be noted.

(1) Improved Physical Properties at Low Temperature

As the ratio of the polycarbonate resin increases, higher values of the energy at maximum impact at −10° C. were obtained. However, when the polycarbonate resin is 3% by weight, the increase in the energy at maximum impact at −10° C. was very small compared to a case of not containing the polycarbonate resin. Based on this, it is found that the polycarbonate resin is preferably 5% by weight or more.

(2) Results of Chemical Resistance Test

As the ratio of the polycarbonate resin increases, lower chemical resistance was yielded. In particular, when the ratio of the polycarbonate resin is 50% by weight, the chemical resistance is very low, and compared to the case in which the ratio of the polycarbonate resin is 40% by weight, the decrease in the chemical resistance is significant. Thus, the polycarbonate resin is preferably 40% by weight or less.

Second Embodiment

Another embodiment of the present invention is the resin composition described above but additionally containing a UV absorbing agent and/or a hydrolysis inhibitor, in which the total of the UV absorbing agent and the hydrolysis inhibitor is 0.1 to 6.0 parts by weight per 100 parts by weight of the poly(1,4-cyclohexylene dimethylene terephthalate) copolyester resin and the polycarbonate resin in total.

For performing polymer alloying by melting under heating, it is preferable that the poly(1,4-cyclohexylene dimethylene terephthalate) copolyester resin be used at 60% by weight to 95% by weight and the polycarbonate resin be used at 5% by weight to 40% by weight (100% by weight in total). Because the poly(1,4-cyclohexylene dimethylene terephthalate) copolyester resin by itself has no sufficient weather resistance, the UV absorbing agent and the hydrolysis inhibitor are added at 0.1 to 6.0 parts by weight in total per 100 parts by weight of the poly(1,4-cyclohexylene dimethylene terephthalate) copolyester resin and the polycarbonate resin in total to provide the weather resistance.

Accordingly, not only a novel resin composition having an improvement in weather resistance and low-temperature impact resistance, which remain as a problem of the poly (1,4-cyclohexylene dimethylene terephthalate) copolyester resin, but also a novel resin composition having excellent weather resistance while maintaining the chemical resistance and impact resistance at room temperature that are owned by the poly(1,4-cyclohexylene dimethylene terephthalate) copolyester can be obtained.

By performing the polymer alloying, a novel resin composition having not only the improved weather resistance and low-temperature impact resistance, which remain as a problem of the poly(1,4-cyclohexylene dimethylene terephthalate) copolyester resin but also excellent weather resistance while maintaining the chemical resistance and impact resistance at room temperature that are owned by the poly(1,4-cyclohexylene dimethylene terephthalate) copolyester can be obtained.

The total of the UV absorbing agent and the hydrolysis inhibitor may be, for example, 0.5 parts by weight or more, 1.0 parts by weight or more, or 2.0 parts by weight or more, and also 5.5 parts by weight or less, 5.0 parts by weight or less, or 4.0 parts by weight or less.

The UV absorbing agent and the hydrolysis inhibitor can be mixed either singly or in combination. In case of a combination, the UV absorbing agent and the hydrolysis inhibitor can be mixed at a weight ratio of 10:90 to 90:10, or 40:60 to 60:40, for example.

As the UV absorbing agent which may be used in the present invention, a benzoate compound, a benzotriazine compound, a benzotriazole compound, a benzophenone compound, a benzoxamine compound, or the like can be used. More preferably, however, 2,2'-p-phenylene bis(3,1-benzoxazin-4-one) as a benzoxazine compound, which is not easily affected by discoloration, is desirable.

Examples of the benzoate compound include 2-(2-hydroxy-3,5-di-t-amylphenyl)benzotriazole, 2-(2-hydroxy-5-t-octylphenyl)benzotriazole, 2-(3,5-di-t-butyl-2-hydroxyphenyl)-5-chlorobenzotriazole, 2-(3,5-di-t-butyl-2-hydroxyphenyl)benzotriazole, 2-(3-t-butyl-5-methyl-2-hydroxyphenyl)-5-chlorobenzotriazole, and 2-(5-methyl-2-hydroxyphenyl)benzotriazole.

Examples of the benzotriazine compound include 2-(4,6-dibiphenyl-1,3,5-triazin-2-yl)-5-hexyloxyphenol, 2-(4,6-dibiphenyl-1,3,5-triazin-2-yl)-5-(2-ethylhexyloxy)phenol, 2-(4,6-diphenyl-1,3,5-triazin-2-yl)-5-ethyloxyphenol, 2-(4, 6-diphenyl-1,3,5-triazin-2-yl)-5-octyloxyphenol, 2-(4,6-diphenyl-1,3,5-triazin-2-yl)-5-butyloxyphenol, 2-(4,6-diphenyl-1,3,5-triazin-2-yl)-5-propyloxyphenol, 2-(4,6-diphenyl-1,3,5-triazin-2-yl)-5-hexyloxyphenol, 2-(4,6-diphenyl-1,3, 5-triazin-2-yl)-5-hexyloxyphenol, 2-(4,6-diphenyl-1,3,5-triazin-2-yl)-5-methyloxyphenol, 2-(4,6-bis(2,4-dimethylphenyl)-1,3,5-triazin-2-yl)-5-(octyloxy)phenol, and 2-(4,6-bis(2,4-dimethylphenyl)-1,3,5-triazin-2-yl)-5-hexyloxyphenol.

Examples of the benzotriazole compound include 2-(2'-hydroxy-5'-methylphenyl)benzotriazole, 2-(2'-hydroxy-5'-methylphenyl)benzotriazole, "2-[2'-hydroxy-3',5'-bis(α,(-dimethylbenzyl)phenyl]benzotriazole", 2-[2'-hydroxy-3'-tert-butyl-5'-(methacryloyloxyethyl)phenyl]-2H-benzotriazole, 2-[2'-hydroxy-5'-(methacryloyloxyethyl) phenyl]-b 5-chloro-2H-benzotriazole, 2-[2'-hydroxy-5'-(methacryloyloxyethyl)phenyl]-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl) phenyl]-5-cyano-2H-benzotriazole, 2-[2'-hydroxy-5'-(methacryloyloxyethyl)phenyl]-5-nitro-2H-benzotriazole, 2-[2'-hydroxy-5'-(methacryloyloxyethyl)phenyl]-5-methoxy-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl)phenyl]-2H-benzotriazole, 2-[2'-hydroxy-5'-(methacryloyloxymethyl)phenyl]-2H-benzotriazole, 2-[2'-hydroxy-5'-tert-butyl-3'-(methacryloyloxyethyl)phenyl]-2H-benzotriazole, 6-(2-benzotriazolyl)-4-t-octyl-6'-t-butyl-4'-methyl-2,2'-methylene bisphenol-polycaprolactone-modified 2-hydroxyphenylbenzotriazole, and "2,2'-methylene bis[4-(1,1,3,3-tetramethylbutyl)-6-(2Hbenzotriazole-2-yl)phenol]".

Examples of the benzophenone compound include "2,2', 4,4'-tetrahydroxybenzophenone", 2,4-dihydroxybenzophenone, 2-hydroxy-4-methoxy-5-sulfobenzophenone, 2-hydroxy-4-methoxybenzophenone, and bis(2-methoxy-4-hydroxy-5-benzoylphenyl)methane.

Examples of the benzoxazine compound include 2,2-(1, 5-naphthalene)bis(3,1-benzoxazin-4-one), 2,2'-p-phenylene bis(3,1-benzoxazin-4-one), and 2,2'-(2,6-naphthalene)bis(3, 1-benzoxazin-4-one).

Those UV absorbing agents may be used either singly or in combination.

As the hydrolysis inhibitor used in the present invention, a carbodiimide compound, an epoxy compound, an oxazoline compound or the like can be used. However, poly(4,4'-methylene biscyclohexyl carbodiimide) as an aliphatic carbodiimide compound or STABAXOL (registered trademark) manufactured by Rhein Chemie, which is an aromatic polymer carbodiimide compound, is preferable.

Examples of the carbodiimide compound include 1,3,5-triisopropylbenzene-2,4-carbodiimide, 1,3-phenylenecarbodiimide, 1,4-phenylen diisocyanate, 1,5-naphthalenecarbodiimide, 2,4-tolylenecarbodiimide, 2,6-diisopropylphenyl carbodiimide, 2,6-tolylenecarbodiimide, 4,4'-diphenyldimethylmethanecarbodiimide, 4,4'-diphenylmethanecarbodiimide, N,N'-di-n-butyl carbodiimide, N,N'-di-n-hexyl carbodiimide, N,N'-diisopropyl carbodiimide, N,N'-dicyclohexyl carbodiimide, N,N'-diphenyl carbodiimide, N,N'-bis(2,4,6-trimethylphenyl)carbodiimide, N,N'-bis(2,6-diisopropylphenyl)carbodiimide, N,N'-bis(2,6-diethylphenyl)carbodiimide, N,N'-bis(2,6-dimethylphenyl)carbodiimide, N,N'-bis(2,6-dimethoxyphenyl)carbodiimide, N,N'-bis (2-isopropylphenyl)carbodiimide, N,N'-bis(2-ethylphenyl) carbodiimide, N,N'-bis(2-methylphenyl)carbodiimide, N,N'-di-2,4,6-triisobutylphenyl carbodiimide, N,N'-di-2,4,6-triisopropylphenyl carbodiimide, N,N'-di-2,4,6-trimethylphenyl carbodiimide, N,N'-di-2,6-di-tert-butylphenyl carbodiimide, N,N'-di-2,6-diisopropylphenyl carbodiimide, N,N'-di-2,6-diethylphenyl carbodiimide, N,N'-di-2,6-dimethylphenyl carbodiimide, N,N'-di-2-isobutyl-6-isopropylphenyl carbodiimide, N,N'-di-2-ethyl-6-isopropylphenyl carbodiimide, N,N'-di-o-isobutylphenyl carbodiimide, N,N'-di-o-isopropylphenyl carbodiimide, N,N'-di-o-ethylphenyl carbodiimide, N,N'-di-o-tolyl carbodiimide, N,N'-di-p-aminophenyl carbodiimide, N,N'-di-p-isobutylphenyl carbodiimide, N,N'-di-p-isopropylphenyl carbodiimide, N,N'-di-p-ethylphenyl carbodiimide, N,N'-di-p-tolyl carbodiimide, N,N'-di-p-nitrophenyl carbodiimide, N,N'-di-p-hydroxyphenyl carbodiimide, N,N'-dioctyldecyl carbodiimide, N,N'-di-cyclohexyl carbodiimide, N,N'-diphenyl carbodiimide, N-octadecyl-N'-tolyl carbodiimide, N-octadecyl-N'-phenyl carbodiimide, N-cyclohexyl-N'-tolyl carbodiimide, N-tolyl-N'-cyclohexyl carbodiimide, N-tolyl-N'-phenyl carbodiimide, N-phenyl-N'-tolyl carbodiimide, N-benzyl-N'-tolyl carbodiimide, N-benzyl-N'-phenyl carbodiimide, p-phenylene-bis-di-o-tolyl carbodiimide, p-phenylene-bis-dicyclohexyl carbodiimide, t-butylisopropyl carbodiimide, t-butylisopropyl carbodiimide, isophorone carbodimide, isophorone carbodiimide, ethylene-bis-diphenyl carbodiimide, N,N'-benzyl carbodiimide, xylylene carbodiimide, di-t-butyl carbodiimide, di-(-naphthyl carbodiimide, diisobutyl carbodiimide, diisopropyl carbodiimide, dioctyl carbodiimide, cyclohexane-1,4-carbodiimide, dicyclohexyl carbodiimide, dicyclohexylmethane-4,4'-carbodiimide, diphenyl carbodiimide, dimethyl carbodiimide, tetramethylxylylene carbodiimide, hexamethylene carbodiimide, hexamethylene-bis-dicyclohexyl carbodiimide, benzene-2,4-diisocyanate-1,3,5-tris(1-methylethyl)carbodiimide (trade name, methylcyclohexane carbodiimide), and poly(4,4'-methylene biscyclohexyl carbodiimide).

Examples of the epoxy compound include 1-(β,γ-epoxypropoxy)-2-ethoxyethane", "1-(β,(-epoxypropoxy)-2-benzyloxyethane", "1,4-bis((,(-epoxypropoxy)butane", "1,4-bis((,(-epoxypropoxy)benzene", "1,6-bis((,(-epoxypropoxy) hexane", 2,2'-9,9'-diphenoxyethanebis(2-oxazoline), "bisglycidyl polyether obtained by a reaction between 2,2-bis-[p-((,(-epoxypropoxy)phenyl]propane, bisphenols such as 2,2-bis-(4-hydroxyphenyl)propane or 2,2-bis-(4-hydroxyphenyl)methane and epichlorohydrine", o-phenylglycidyl ether, p-toluoyl acid glycidyl ester, t-Bu-benzoic acid glycidyl ester, adipic acid diglycidyl ester, isophthalic acid diglycidyl ester, octadecane dicarboxylic acid diglycidyl ester, oleic acid glycidyl ester, succinic acid diglycidyl ester, cyclohexane carboxylic acid glycidyl ester, cyclohexane dicarboxylic acid diglycidyl ester, stearic acid glycidyl ester, stearol acid glycidyl ester, sebacic acid diglycidyl ester, tetrahydrophthalic acid diglycidyl ester, terephthalic acid diglycidyl ester, dodecane dionic acid diglycidyl ester, trimellitic acid triglycidyl ester, naphthalene dicarboxylic acid diglycidyl ester, versatic acid glycidyl ester, palmitic acid glycidyl ester, phenylglycidyl ether, phthalic acid diglycidyl ester, hexahydrophthalic acid diglycidyl ester, behenolic acid glycidyl ester, behenic acid glycidyl ester, pellargonic acid glycidyl ester, methylterephthalic acid diglycidyl ester, lauric acid glycidyl ester, linolic acid glycidyl ester, linolenic acid glycidyl ester, and benzoic acid glycidyl ester.

Examples of the oxazoline compound include 2,2'-m-phenylene bis(2-oxazoline), 2,2'-m-phenylene bis(4,4-dimethyl-2-oxazoline), 2,2'-m-phenylene bis(4-methyl-2-oxazoline), 2,2'-o-phenylene bis(2-oxazoline), 2,2'-p-phenylene bis(2-oxazoline), 2,2'-p-phenylene bis(4,4-dimethyl-2-oxazoline), 2,2'-p-phenylene bis(4-methyl-2-oxazoline), 2,2'-ethylene bis(2-oxazoline), 2,2'-ethylene bis (4-methyl-2-oxazoline), 2,2'-octamethylene bis(2-oxazoline), 2,2'-cyclohexylene bis(2-oxazoline), 2,2'-diphenylene bis(2-oxazoline), 2,2'-decamethylene bis(2-oxazoline), 2,2'-tetramethylene bis(2-oxazoline), 2,2'-tetramethylene bis(4,4-dimethyl-2-oxazoline), 2,2'-bis(2-oxazoline), 2,2'-bis(4,4'-diethyl-2-oxazoline), 2,2'-bis(4,4-dimethyl-2-oxazoline), 2,2'-bis(4-ethyl-2-oxazoline), 2,2'-bis(4-cyclohexyl-2-oxazoline), 2,2'-bis(4-phenyl-2-oxazoline), 2,2'-bis(4-butyl-2-oxazoline), 2,2'-bis(4-propyl-2-oxazoline), 2,2'-bis(4-hexyl-2-oxazoline), 2,2'-bis(4-benzyl-2-oxazoline), 2,2'-bis(4-methyl-2-oxazoline), and 2,2'-hexamethylene bis(2-oxazoline).

Those hydrolysis inhibitors may be used either singly or in combination.

The resin composition of the present invention may further contain an optional component such as an anti-oxidant. As for the anti-oxidant used for the present invention, a phosphorus compound, a phenol compound, or the like can be used.

Examples of the phosphorus compound include 2,2'-methylene bis(4,6-di-tert-butylphenyl)octylphosphite, 4,4'-butyl idene-bis(3-methyl-6-tert-butylphenyldi(tridecyl) phosphite)tetra(tridecyl)-4,4'-isopropylidene diphenyldiphosphite, distearylpentaerythritol diphosphite, diphenyl hydrogen phosphite, diphenylmono(tridecyl)phosphite, diphenylmonodecylphosphite, dilauryl hydrogen phosphite, dilaurylpentaerythritol diphosphite, tetraphenyldipropylene glycol diphosphite, tetraphenyltetra(tridecyl) pentaerythritol tetraphosphite, triethylphosphite, tris(2,4-di-tert-butylphenyl)phosphite, tris(2-ethylhexyl)phosphite, tris (4-tert-butylphenyl)phosphite, tris(tridecyl)phosphite, triphenylphosphite, tristearylphosphite, tridecylphosphite, bis(2,4-dicumylphenyl)pentaerythritol diphosphite, bis(2,6-di-tert-butyl-4-methylphenyl)pentaerythritol diphosphite, bis(2,4-di-tert-butylphenyl)pentaerythritol diphosphite, tris (nonylphenyl)phosphite, bis(tridecyl)pentaerythritol diphosphite, bis(nonylphenyl)pentaerytlhritol diphosphite, monophenyldidecylphosphite, hydrogenated bisphenol A pentaerythritol phosphite polymer, hydrogenated bisphenol A phenolphosphite polymer, 2,2'-ethylidene bis(4-methyl-6-tert-butylphenyl)(2-tert-butyl-4-methylphenyl)phosphite, 2,2'-methylene bis(4,6-di-tert-butylphenyl)(2,4-di-tert-butylphenyl)phosphite, 2,2'-methylene bis(4,6-di-tert-butylphenyl)(2-tert-butyl-4-methylphenyl)phosphite, tris(2,4-di-tert-butylphenyl)phosphite, tetrakis(2,4-di-isopropylphenyl)-4,4'-biphenylene diphosphonite, tetrakis(2,4-di-n-butylphenyl)-4,4'-biphenylene diphosphonite, tetrakis (2,4-di-tert-butylphenyl)-3,3'-biphenylene diphosphonite, tetrakis(2,4-di-tert-butylphenyl)-4,3'-biphenylene diphosphonite, tetrakis(2,4-di-tert-butylphenyl)-4,4'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-3,3'-biphenylene diphosphonite, tetrakis(2,6-di-tert-butylphenyl)-4,3'-biphenylene diphosphonite, tetrakis(2,6-di-tert-butylphenyl)-4,4'-biphenylene diphosphonite, 1,1,3-tris(2-methyl-4-ditridecylphosphite-5-t-butylphenyl)butane, tetrakis(2,4-di-t-butylphenyl)-4,4'-biphenylene phosphonite, bis(2,6-di-t-butyl-4-methylphenyl)pentaerythritoldiphosphite, 2,2-methylene bis(4,6-di-tert-butylphenyl)octylphosphite, diisopropylmonophenylphosphite, dioctylmonophenylphosphite, dicyclohexylpentaerythritol diphosphite, didecylmonophenylphosphite, trioctadecylphosphite, trioctylphosphite, tris(2,6-di-tert-butylphenyl) phosphite, tris(di-iso-propylphenyl)phosphite, tris(di-n-butylphenyl)phosphite, tris(diethylphenyl)phosphite, bis(2,6-di-tert-butyl-4-ethylphenyl)pentaerythritol diphosphite, phenylbisphenol A pentaerythritol diphosphite, monooctyldiphenylphosphite, monodecyldiphenylphosphite, and monobutyldiphenylphosphite.

Examples of the phenol compound include 1,1,3-tris(2-methyl-4-hydroxy-5-tert-butyl-4-hydroxybenzyl)benzene, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris2[3(3,5-di-tert-butyl-4-hydroxyphenyl)propionyloxy]ethylisocyanurate, 1,3,5-trimethyl-2,4,6-tris(3,5-di-tert-butyl-4-hydroxybenzyl)benzene, 1,6-hexan diol bis[3-(3,5-di-tert-butyl-4-hydroxyphenyl)propionate], 2,2'-dimethylene-bis(6-(-methyl-benzyl-p-cresol)2,2'-ethylidene-bis(4,6-di-tert-butylphenol), 2,2'-thiobis(4-methyl-6-tert-butylphenol), 2,2'-butylidene-bis(4-methyl-6-tert-butylphenol), 2,2'-methylene bis(4-ethyl-6-tert-butylphenol), 2,2'-methylene bis(4-methyl-6-cyclohexylphenol), 2,2-thiodiethylene bis-[3-(3,5-di-tert-butyl-4-hydroxyphenyl)propionate], 2,4-bis(n-octylthio)-6-(4-hydroxy-3',5'-di-tert-butylanilino)-1,3,5-triazine, 2,6-di-tert-butyl-4-(N,N-dimethylaminomethyl)phenol, 2-tert-butyl-6-(3'-tert-butyl-5'-methyl-2'-hydroxybenzyl)-4-methylphenyl acrylate, 3,5-di-tert-butyl-4-hydroxybenzylphosphonatediethyl ester, 3,9-bis{2-[3-(3-tert-butyl-4-hydroxy-5-methylphenyl)propionyloxy]-1,1,-dimethylethyl}-2,4,8,10-tetraoxaspiro[5,5]undecane, 4,4'-di-thiobis(2,6-di-tert-butylphenol), 4,4'-thiobis(3-methyl-6-tert-butylphenol), 4,4'-thiobis(6-tert-butyl-m-cresol), 4,4'-tri-thiobis(2,6-di-tert-butylphenol), 4,4'-butylidene bis(3-methyl-6-tert-butylphenol), 4,4'-methylene bis(2,6-di-tert-butylphenol), N,N'-bis[3-(3,5-di-tert-butyl-4-hydroxyphenyl)propionyl]hydrazine, N,N'-hexamethylene bis-(3,5-di-tert-butyl-4-hydroxyhydrocinnamide), n-octadecyl-3-(3,5-di-tert-butyl-4-hydroxyphenyl)propionate, α-tocopherol, sinapyl alcohol, tetrakis[3-(3,5-di-tert-butyl-4-hydroxyphenyl)propionyloxymethyl]methane, triethylene glycol-N-bis-3-(3-tert-butyl-4-hydroxy-5-methylphenyl) propionate, tris(3,5-di-tert-butyl-4-hydroxyphenyl)isocyanurate, tris(3,5-di-tert-butyl-4-hydroxybenzyl)isocyanurate, bis(3,5-di-tert-butyl-4-hydroxybenzyl)sulfide, bis[2-tert-butyl-4-methyl6-(3-tert-butyl-5-methyl-2-hydroxy benzyl)phenyl]terephthalate, butylhydroxytoluene, 1,3,5-tris(2,6-dimethyl-3-hydroxy-4-t-butylbenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, 2,2'-ethylidene bis(4,6-di-t-butylphenol), 2,2'-ethylidene bis(4-sec-butyl-6-t-butylphenol), 2,6-di-t-butyl-p-cresol, 2,6-diphenyl-4-octadecyloxyphenol, 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5]undecane, 4,4'-butylidene bis(6-t-butyl-m-cresol), distearyl(3,5-di-t-butyl-4-hydroxybenzyl)phosphonate, stearyl(3,5-di-t-butyl-4-hydroxyphenyl)propionate, tetrakis[methylene-3-(3,5-di-t-butyl-4-hydroxyphenyl)propionate]methane, bis[2-t-butyl-4-methyl-6-(2-hydroxy-3-t-butyl-5-methylbenzyl)phenyl] terephthalate, bis[3,3-bis(4-hydroxy-3-t-butylphenyl) butyric acid]glycol ester, bis[β-(3-t-butyl-4-hydroxy-5-methylphenyl)propionate, 1,1,3-tris(2-methyl-4-hydroxy-5-tert-butylphenyl)butane, 1,6-hexan diolbis[(-(3-tert-butyl-4-hydroxy-5-methylphenyl)propionate], 2,2'-methylene bis(4-methyl-6-tert-butylphenol), 4,4'-butylidene bis(6-tert-butyl-3-methylphenol), octadecyl[(-(3-tert-butyl-4-hydroxy-5-methylphenyl)propionate], triethylene glycol bis[(-(3-tert-butyl-4-hydroxy-5-methylphenyl)propionate], pentaerythritol-tetrakis[(-(3-tert-butyl-4-hydroxy-5-methylphenyl)propionate], 1,3,5-tris(3,5-di-t-butyl-4-hydroxybenzyl)isocyanurate, 2,6-di-t-butyl-4-methylphenol, and tetrakis[3-(3,5-di-t-butyl-4-hydroxyphenyl) propionyloxymethyl]methane.

Those anti-oxidants may be used either singly or in combination.

The effect of having the co-presence of the UV absorbing agent (for example, CYASORB UV-3638 manufactured by Cytec Company) and/or hydrolysis inhibitor (for example, "LA-" manufactured by Nisshinbo Chemical Inc.), each in an amount of 0.5 parts by weight to 0.25 parts by weight per 100 parts by weight in total, is shown in Table 1. Explanations of the results are the same as those described above.

The results of performing each test for the test specimen in which the UV absorbing agent (benzoxazine compound; CYASORB UV-3638 manufactured by Cytec Company, 2,2'-p-phenylenebis(3,1-benzoxazin-4-one)) and hydrolysis inhibitor (carbodiimide compound; LA-1, CARBODILITE, manufactured by Nisshinbo Chemical Inc., poly(4,4'-methylene biscyclohexyl carbodiimide)) are added at 0.0 to 7.0 parts by weight into a total of 100% by weight of 80% by weight of TRITAN "TX1000" (TRITAN of general grade, manufactured by Eastman Chemical Company) as a poly(1, 4-cyclohexylene dimethylene terephthalate) copolyester resin and 20% by weight of polycarbonate "302-4" (standard grade, manufactured by Sumika Styron Polycarbonate Limited) as a polycarbonate resin are described with reference to Table 4 of Examples that are described below.

In Table 4, results for the test item, that is, the Charpy impact test before and after the accelerated weather resistance test, are shown.

Based on the above results, it was found that the total of the UV absorbing agent and the hydrolysis inhibitor that are added is suitably in the range of 0.1 to 6.0 parts by weight per total of 100% by weight containing 80% by weight of the poly(1,4-cyclohexylene dimethylene terephthalate) copolyester resin and 20% by weight of the polycarbonate resin in total.

Based on the above results, it was also found that using the UV absorbing agent and the hydrolysis inhibitor in combination enables obtaining a synergistic effect and maintaining the Charpy impact strength for longer period of time compared to a case of using them individually.

From the results of Table 4, the following points can be noted.

(1) Result 1 of Charpy impact test before and after accelerated weather resistance test When the case in which a total of the UV absorbing agent and the hydrolysis inhibitor is 6.0 parts by weight is compared to the case in which it is 7.0 parts by weight, the Charpy impact strength after accelerated weather resistance test for 2000 hours are the same. Thus, it was found that the effect of adding the UV absorbing agent and the hydrolysis inhibitor is saturated at 6.0 parts by weight or more, and because it is economically disadvantageous, the total of the UV absorbing agent and the hydrolysis inhibitor is preferably 6.0 parts by weight or less.

(2) Result 2 of Charpy impact test before and after accelerated weather resistance test It was found that the Charpy impact strength is maintained even after the accelerated weather resistance test is performed for a long period of time, as the total of the UV absorbing agent and hydrolysis inhibitor increases. Further, even when the total of the UV absorbing agent and hydrolysis inhibitor is 0.1 parts by weight, the Charpy impact strength is maintained better after the accelerated weather resistance test compared to a case of not adding them.

(3) Result 3 of Charpy impact test before and after accelerated weather resistance test When the UV absorbing agent and hydrolysis inhibitor are used at 1.0 part by weight and 1.0 part by weight, respectively, that is, the total of 2.0 parts by weight, the Charpy impact strength is maintained for a longer period of time of the accelerated weather resistance test compared to a case of using only the UV absorbing agent at 2.0 parts by weight or only the hydrolysis inhibitor at 2.0 parts by weight. Based on this, the combined use of the UV absorbing agent and the hydrolysis inhibitor gives a synergistic effect, yielding a higher effect than using each of them individually.

The UV absorbing agent and the hydrolysis inhibitor are generally expensive. Thus, due to an economical reason, it is desirable to add a minimum but sufficient amount suitable for the application purpose of the resin.

Third Embodiment

Another embodiment of the present invention is the resin composition containing a poly(1,4-cyclohexylene dimethylene terephthalate) copolyester resin and a polycarbonate resin, in which the poly(1,4-cyclohexylene dimethylene terephthalate) copolyester resin is contained at 60% by weight to 95% by weight, the polycarbonate resin is contained at 5% by weight to 40% by weight, the melt viscosity ratio between the poly(1,4-cyclohexylene dimethylene terephthalate) copolyester resin and polycarbonate resin ((melt viscosity of the polycarbonate resin)/(melt viscosity of the poly(1,4-cyclohexylene dimethylene terephthalate) copolyester resin)) is 2.0 or higher at 280° C. and a shear rate of 10 (sec$^{-1}$), and the MFR value (300° C., 1.2 kg) of the polycarbonate resin is less than 15 g/10 min.

According to another embodiment of the present invention, a resin composition maintaining high original chemical resistance of the poly(1,4-cyclohexylene dimethylene terephthalate) copolyester resin itself can be obtained by using an optimum polycarbonate, although the property of having lower weather resistance and low-temperature impact resistance remained as a problem of the poly(1,4-cyclohexylene dimethylene terephthalate) copolyester resin can be solved by the method described above. It is also possible to provide a resin composition maintaining the transparency.

The poly(1,4-cyclohexylene dimethylene terephthalate) copolyester resin and the polycarbonate resin are as described above.

It is sufficient that the melt viscosity ratio between the poly(1,4-cyclohexylene dimethylene terephthalate) copolyester resin and polycarbonate resin ((melt viscosity of the polycarbonate resin)/(melt viscosity of the poly(1,4-cyclohexylene dimethylene terephthalate) copolyester resin)) is 2.0 or higher at 280° C. and a shear rate of 10 (sec$^{-1}$). The melt viscosity ratio is preferably 3.0 or higher, more preferably 4.0 or higher, and even more preferably 4.5 or higher.

By having the melt viscosity ratio of 2.0 or higher, mechanical properties, in particular low-temperature impact resistance, can be improved, and according to a concentration of the poly(1,4-cyclohexylene dimethylene terephthalate) copolyester resin on a surface of a molded body, chemical resistance can be exhibited as a molded body. Because the poly(1,4-cyclohexylene dimethylene terephthalate) copolyester resin having excellent chemical resistance concentrates more on a surface of a molded body as the melt viscosity ratio increases, the chemical resistance of a molded body can be improved.

Figure 10:
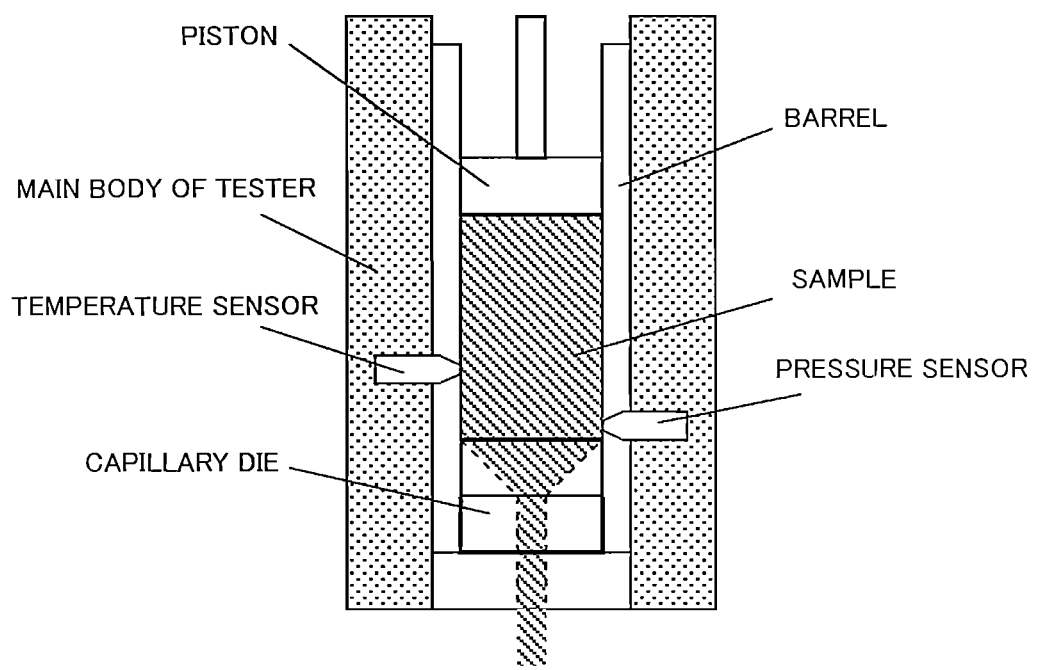
FIG. 10 is a diagram illustrating a tester for measuring melt viscosity.

As described herein, the melt viscosity of a resin can be measured based on "Testing Method for Flow Properties of Plastics with a Plastics—Capillary Rheometer and a Slit Die Rheometer (JIS K7199)." Schematic cross-sectional view of the testing apparatus for performing this measurement is shown in FIG. 10.

The melt viscosity of the poly(1,4-cyclohexylene dimethylene terephthalate) copolyester resin is not particularly limited, and those having 200 to 1000 (Pa·s) at 280 (C and a shear rate of 10 (sec-1) can be used. More preferably, the melt viscosity is 400 to 800 (Pa·s).

The melt viscosity of the polycarbonate resin is not particularly limited, and those having 1000 to 5000 (Pa·s) at 280 (C and a shear rate of 10 (sec-1) can be used. More preferably, the melt viscosity is 1100 (Pa·s) or higher.

It is sufficient that the polycarbonate resin has an MFR value (300 (C, 1.2 kg) of 15 g/10 min or less. The MFR value is preferably 12 g/10 min or less, more preferably 9 g/min or less, and even more preferably 6 g/min or less. The lower limit of the MFR value is not particularly limited, but it is generally 1 or higher.

As described herein, the MFR value indicates a melt flow rate value which can be used for evaluating the flow properties of a resin. The MFR value can be measured by using a melt flow indexer as a testing device. The testing method is based on JIS K7210.

Meanwhile, in addition to the resin, a UV absorbing agent and/or a hydrolysis inhibitor can be included like the aforementioned embodiments. Accordingly, the weather resistance can be further improved.

The results obtained by performing each test for the test specimen having TRITAN "TX1000" (TRITAN of general grade for injection, manufactured by Eastman Chemical Company) as a poly(1,4-cyclohexylene dimethylene terephthalate) copolyester resin at 70% by weight and four kinds of the polycarbonate resin as a polycarbonate resin at 30% by weight are described with reference to Table 5 of Examples described below.

Examples of the polycarbonate resin used for the test include polycarbonate "302-4" (standard grade, manufactured by Sumika Styron Polycarbonate Limited), polycarbonate "E2000UR" (general polycarbonate for extrusion, manufactured by Mitsubishi Engineering-Plastics Corporation), polycarbonate "S2000U" (standard grade, manufactured by Mitsubishi Engineering-Plastics Corporation), and polycarbonate "302-15" (standard grade, manufactured by Sumika Styron Polycarbonate Limited).

In Table 5, results for the test items of chemical resistance test, measurement of melt viscosity ratio, and analysis of polycarbonate ratio on a surface of a molded body based on FT-IR, are shown.

From the results of Table 5, the following points can be noted.

(1) Measurement Result of Melt Viscosity

It was found that the melt viscosity ratio decreases as the MFR value of the polycarbonate resin increases.

(2) Measurement Result of Melt Viscosity

It was found that the chemical resistance increases as the melt viscosity ratio of the polycarbonate resin increases.

(3) Ratio of Polycarbonate Resin on Surface Layer of Molded Body Based on FT-IR

It was found that the ratio of the polycarbonate resin on surface layer of molded body decreases as the melt viscosity ratio increases.

(Poly(1,4-cyclohexylene dimethylene terephthalate) copolyester resin)

Herein below, the poly(1,4-cyclohexylene dimethylene terephthalate) copolyester resin to be used is described.

The poly(1,4-cyclohexylene dimethylene terephthalate) copolyester resin is disclosed in JP 3432830 B1 and JP 11 512484 W, and a molded body thereof has an advantage of having improved transparency, crack resistance to stress. It also has excellent physical properties including strength, rigidity, impact resistance, and hydrolysis resistance (paragraph of JP 3432830 B1).

Although conventionally known polyester materials like poly(ethylene terephthalate) (PET) and poly(1,4-cyclohexylene dimethylene terephthalate) (PCT) have various favorable properties when prepared as a molded body, it is recognized as a problem that a turbid product or an opaque product is yielded when a relatively thick product is molded, due to easy crystallization of those polymers. Such problem can be solved by using a poly(1,4-cyclohexylene dimethylene terephthalate) copolyester resin.

As for the poly(1,4-cyclohexylene dimethylene terephthalate) copolyester resin to be used in the present invention, those in which the acid component contains a repeating unit from terephthalic acid and/or its derivatives at 90 to 40% by mol, preferably 85 to 52% by mol, and more preferably 83 to 53% by mol, additional dibasic acid at 10 to 60% by mol, preferably 15 to 48% by mol, and more preferably 17 to 48% by mol, and the glycol component containing a repeating unit from 1,4-cyclohexane dimethanol can be used.

Examples of the derivatives of terephthalic acid include dialkyl ester and diaryl ester of terephthalic acid. For example, dimethylterephthalate (DMT), diethylterephthalate, or the like can be used.

As for the additional dibasic acid, cyclohexane dicarboxylic acid, isophthalic acid, naphthalene dicarboxylic acid, diphenyl dicarboxylic acid, stilbene dicarboxylic acid, or a combination of two or more of them can be used. As for the cyclohexane dicarboxylic acid, 1,3- and/or 1,4-cyclohexane dicarboxylic acid can be used.

Instead of the additional dibasic acid, a lower alkyl ester like methyl ester can be used.

The glycol component may further contain one or more types of additional aliphatic or alicyclic glycol preferably having 2 to 20 carbon atoms. Other glycol may be selected from a group consisting of ethylene glycol, diethylene glycol, triethylene glycol, propane diol, butane diol, pentane diol, hexane diol, neopentyl glycol, and 2,2,4,4,-tetramethylcyclobutane diol. Ethylene glycol is particularly preferable.

More specifically, it is preferably a copolyester resin containing dimethylterephthalate (DMT) as an acid component and 1,4-cyclohexylene dimethanol (CHDM) and 2,2,4,4-tetramethyl-cyclobutan diol (TMCD) as a glycol component.

Further, the poly(1,4-cyclohexylene dimethylene terephthalate) copolyester resin preferably has inherent viscosity of 0.4 to 1.1 dL/g, which is measured in a 60/40 phenol/tetrachloroethane solution containing 0.5 g of polymer in 100 mL solution.

As for the poly(1,4-cyclohexylene dimethylene terephthalate) copolyester resin, those synthesized by using a branching agent can be also used. As for the branching agent, an extremely small amount (less than 1.5% by mol) of trimellitic anhydride, trimellitic acid, pyromellitic acid dianhydride, trimesic acid, hemimellitic acid, glycerol, trimethylol propane, pentaerythritol, 1,2,4-butanetriol, 1,2,6-hexanetriol, sorbitol, 1,1,4,4-tetrakis(hydroxymethyl)cyclohexane, or dipentaerythritol can be used.

The poly(1,4-cyclohexylene dimethylene terephthalate) copolyester resin can be easily produced by a known melt-phase or solid-phase polycondensation. It can be also prepared by a batch method or a continuous method. Exemplary methods are described in the specifications of U.S. Pat. No. 4,256,861, U.S. Pat. No. 4,539,390, and U.S. Pat. No. 2,901,466, and it also includes production by direct condensation and production by ester exchange.

Examples of a commercially available poly(1,4-cyclohexylene dimethylene terephthalate) copolyester resin include TRITAN manufactured by Eastman Chemical Company. For example, the TRITAN products shown below can be used.

TX1000: 99° C. heat resistance grade (HDT: 0.455 MPa).
TX1001: injection molding grade of TX1000.
TX1500HF: high fluidity grade of TX1000.
TX2000: 109° C. heat resistance grade (HDT: 0.455 MPa).
TX2001: injection molding grade of TX2000.

(UV Absorbing Agent/Hydrolysis Inhibitor)

The poly(1,4-cyclohexylene dimethylene terephthalate) copolyester resin is recognized to have low weather resistance, and as a means for dealing with it, adding 0.05 parts by weight or more of a UV absorbing agent to total 100 parts by weight of the poly(1,4-cyclohexylene dimethylene terephthalate) copolyester resin and polycarbonate resin is effective as a means against photodeterioration.

Further, as a means for dealing with hydrolysis, adding 0.05 parts by weight or more of a hydrolysis inhibitor to total 100 parts by weight of the poly(1,4-cyclohexylene dimethylene terephthalate) copolyester resin and polycarbonate resin is effective.

As for the UV absorbing agent and hydrolysis inhibitor, those described above can be used.

By using the UV absorbing agent and hydrolysis inhibitor in combination, a synergistic effect is generated, yielding a higher effect than adding it alone.

It is possible that, to total 100 parts by weight of the poly(1,4-cyclohexylene dimethylene terephthalate) copolyester resin and polycarbonate resin, the UV absorbing agent and hydrolysis inhibitor are added up to 6.0 parts by weight in total. When it is more than that, the UV absorbing agent and hydrolysis inhibitor may be precipitated on a surface of the molded body.

(Polycarbonate Resin)

The polycarbonate resin is as follows.

As for the polycarbonate resin, a thermoplastic aromatic polycarbonate polymer or copolymer optionally having a branch, which is obtained by reacting an aromatic dihydroxy compound or a small amount of a polyhydroxy compound with a carbonate precursor, can be used.

As for the method for producing an aromatic polycarbonate resin, the production can be made by a conventionally known phosgene method (interfacial polymerization), melting (ester exchange) or the like. The production is made by using bisphenol A and phosgene (or diphenyl carbonate) as a raw material.

Examples of the aromatic dihydroxy compound include bis(hydroxyaryl)alkanes exemplified by 2,2-bis(4-hydroxyphenyl)propane (=bisphenol A), 2,2-bis(3,5-dibromo-4-hydroxyphenyl)propane (=tetrabromo bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl) octane, and 2,2-bis(4-hydroxy-3-methylphenyl)propane; bis(hydroxyaryl)cycloalkanes exemplified by 1,1-bis(4-hydroxyphenyl)cyclopentane, 1,1-bis(4-hydroxyphenyl)

cyclohexane, and 1,1-bis(4-hydroxyphenyl)-3,3,5-trimethylcyclohexane; bisphenols containing a cardo structure exemplified by 9,9-bis(4-hydroxyphenyl)fluorine and 9,9-bis(4-hydroxy-3-methylphenyl)fluorene; dihydroxydiaryl ethers exemplified by 4,4'-dihydroxydiphenyl ether and 4,4'-dihydroxy-3,3'-dimethyldiphenyl ether; dihydroxydiaryl sulfides exemplified by 4,4'-dihydroxydiphenyl sulfide and 4,4'-dihydroxy-3,3'-dimethyldiphenyl sulfide; dihydroxydiaryl sulfoxides exemplified by 4,4'-dihydroxydiphenyl sulfoxide and 4,4'-dihydroxy-3,3'-dimethyldiphenyl sulfoxide; dihydroxydiaryl sulfones exemplified by 4,4'-dihydroxydiphenyl sulfone and 4,4'-dihydroxy-3,3'-dimethyldiphenyl sulfone; hydroquinone, resorcin, and 4,4'-dihydroxydiphenyl. The aromatic dihydroxy compound can be used either singly or in combination of two or more types. Among them, 2,2-bis(4-hydroxyphenyl)propane (=bisphenol A) is particularly preferably used from the viewpoint of impact resistance.

As for the carbonate precursor to be reacted with an aromatic dihydroxy compound, carbonyl halide, carbonate ester, haloformate, or the like is used. Specific examples thereof include phosgene; diarylcarbonates such as diphenylcarbonate or ditolylcarbonate; dialkyl carbonates such as dimethylcarbonate or diethylcarbonate; a dihaloformate of dibasic phenol. The carbonate precursor may be used either singly or in combination of two or more types.

Further, the aromatic polycarbonate resin may be a branched aromatic polycarbonate resin obtained by copolymerization of a polyfunctional aromatic compound with functionality of 3 or more.

In order to obtain the branched aromatic polycarbonate resin, a part of the aforementioned aromatic dihydroxy compound can be substituted with a polyhydroxy compound represented by fluoroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl)benzene, or 1,1,1-tri(4-hydroxyphenyl)ethane or with 3,3-bis(4-hydroxyaryl)oxyindole (=isatine bisphenol), 5-chloroisatine, 5,7-dichloroisatine, 5-bromoisatine, or the like, and used. The use amount is preferably in the range of 0.01 to 10% by mol, and it is particularly preferably 0.1 to 2% by mol.

For producing the aromatic polycarbonate resin with the aforementioned aromatic dihydroxy compound and carbonate precursor by interface polymerization or melting ester exchange, a terminal blocking agent may be used, if necessary.

In case of the aromatic polycarbonate resin based on interface polymerization, a terminal blocking agent or a molecular weight controlling agent is generally used. Examples of the terminal blocking agent or molecular weight controlling agent include a compound having a monovalent phenolic hydroxy group or a monovalent carboxylic acid derivative structure. Examples of the compound having a monovalent phenolic hydroxyl group include phenol, substituted phenols such as alkyl phenol, halogenated phenol, alkoxy phenol, or alkoxycarbonyl phenol. Specifically, phenol, methylphenol, p-n-butylphenol, or the like is used. Examples of the compound having a monovalent carboxylic acid derivative structure include carboxylic acid and carboxylic acid chloride. Specific examples include carboxylic acid such as acetic acid, acrylic acid, formic acid, propionic acid, propiolic aid, butyric acid, isobutyric acid, methacrylic acid, palmitic acid, stearic acid, pyruvic acid, acetoacetic acid, glycolic acid, lactic acid, glyceric acid, hexafluoroacetic acid, benzoic acid, naphthoic acid, methyl benzoic acid, butyl benzoic acid, vinyl benzoic acid, pentafluorobenzoic acid, pentabromobenzoic acid, methyl naphthoic acid, or ethyl naphthoic acid, and carboxylic acid chloride or the like derived from those carboxylic acids.

Further, in case of an aromatic polycarbonate resin based on ester exchange, the amount ratio of hydroxyl terminal group at the terminal can be controlled by adjusting the molar ratio between a dihydroxy compound and carbonic acid diester as a raw material or adjusting the degree of pressure decrease. Further, as a more aggressive method, a control method of adding a terminal blocking agent separately during the reaction is also known. At that time, examples of the terminal blocking agent include monovalent phenols, monovalent carboxylic acids, and carbonic acid diesters. For example, a monovalent phenol or a monovalent carboxylic acid with carbon atom number of 9 or more is preferably used. Specific examples thereof include p-propylphenol, o-sec-butylphenol, p-tert-butylphenol, cumylphenol, tert-octylphenol, phenylphenol, naphthylphenol, 4-hydroxy-p-quaterphenyl, butyl benzoic acid, octyl benzoic acid, phenyl benzoic acid, and naphthalene carboxylic acid. As for the carbonic acid diesters, carbonic acid diesters derived from a monovalent phenol with carbon atom number of 9 or more are preferably used. Specific examples thereof include phenylbutylphenylcarbonate, di(butylphenyl)carbonate, phenylcumylphenyl carbonate, di(nonylphenyl)carbonate, and methylphenylnaphthylphenyl carbonate.

The weight average molecular weight (Mw) of the polycarbonate resin is preferably $2 \times 10^4$ to $3 \times 10^4$.

The aromatic polycarbonate is produced and provided by many companies, and can be commercially obtained and used.

As the resin composition of the present invention, by containing the poly(1,4-cyclohexylene dimethylene terephthalate) copolyester resin and polycarbonate resin as a main component, a resin with high transparency can be provided. Meanwhile, coloration can be made by adding a coloring material such as an organic pigment, an inorganic pigment, or a dye to the resin composition of the present invention, and thus a resin composition with any color can be provided.

Types of the organic pigment are not limited, but examples thereof include an anthraquinone-based, isoindolinone-based, indigo-based, quinacridone-based, dioxane-based, disazo-based, phthalocyanin-based, monoazo-based, and fused azo-based organic pigment. More specific examples include a soluble azo pigment such as isoindolinone-based such as anthrone orange, isoindolinone yellow, or isoindolinone orange, quinacridone-based such as quinacridone magenta, quinacridone red, quinophthalone yellow, dianthraquinonyl red, dioxazine violet, disazo yellow, thioindigo-based, toluidine maroon, toluidine red, nickel azo yellow, or permanent red 2B, an insoluble azo pigment such as hanza yellow, pigment yellow, pigment scarlet, or pyrazolone red, a pyranthrone-based such as pyranthrone orange, pyranthrone red, phthalocyanin-based such as phthalocyanin green, phthalocyanin blue, heliobordeaux, perinone orange, perylene-based such as perylene scarlet, perylene red, benzidine yellow, benzimidazolone-based, lithol red, and fused azo-based pigment.

Examples of the inorganic pigment include a spinnel pigment, a titan oxide pigment, an iron oxide pigment, and an extender pigment. More specific examples thereof include carbon black, kaolin, chrome alumina pink, chrome tin pink, cobalt silicate, zirconium silicate, cobalt aluminum chrome blue, cobalt green, cobalt chrome green, cobalt blue, cobalt zinc silica blue, zeolite, cerulean blue, talc, titan yellow, titan cobalt green, vanadium blue, vanadic acid bismuth yellow, Victoria green, ferrite, praseodymium yellow, yellow iron oxide, black iron oxide, aluminum oxide, antimony oxide, chrome oxide, cobalt oxide, zirconium oxide, cerium oxide, titan oxide, nickel oxide, vanadium oxide, bismuth oxide, magnesium oxide, manganese oxide, lanthanide oxide, zinc oxide, copper oxide, cobalt hydroxide, cerium hydroxide, nickel hydroxide, manganese hydroxide, lanthanide hydroxide, zinc hydroxide, red iron oxide, calcium carbonate, cobalt carbonate, barium carbonate, magnesium carbonate, zinc carbonate, copper chrome black, copper-iron manganese black, zinc sulfide, and barium sulfate.

Examples of the dye include an acidic dye, a sulfide dye, a naphthol dye, a mordant dye, a dispersion dye, an acidic mordant dye, a direct dye, a basic dye, a cationic dye, and a reactive dye.

The aforementioned coloring material can be used either singly or in combination of two or more types.

The aforementioned coloring material is preferably mixed at 1 to 10% by weight, and more preferably 2 to 5% by weight per the entire resin composition.

(Polymer Alloying)

The alloying of a polymer consisting of two-component resin includes a non-compatible system, a compatible system, and a partially compatible system. According to the compatible system like the present invention, the two-component resin can be compatibilized at the entire practical range between the glass transition temperature and thermal decomposition temperature (JP 2011-046936 A and JP 2011-012203 A).

By performing melt kneading in the range between the glass transition temperature and thermal decomposition temperature of the poly(1,4-cyclohexylene dimethylene terephthalate) copolyester resin and polycarbonate resin as a two-component resin of the present invention, a resin composition can be obtained. At that time, stirring is preferably performed at a stirring rate of 150 to 180 rpm and temperature of 270 to 280° C.

(Test Method)

The test method adopted in the present description is as follows. The test method is common to the test method of the examples that are described below, unless specifically described otherwise.

(1) Test specimen
(2) Tensile test
(3) Bending property test
(4) Charpy impact strength test
(5) Total transmittance test
(6) Load deflection temperature test (HDT)
(7) Chemical resistance test (environmental stress crack test)
(8) Accelerated weather resistance test
(9) Planar impact test
(10) Measurement of melt viscosity
(11) Analysis of PC ratio by FT-IR
(12) Helmet impact absorption test: for use against flying/dropping
(13) Helmet impact absorption test: for protection at falling
(14) Helmet penetration resistance test: for use against flying/dropping
(15) Helmet penetration resistance test: for protection at falling Specification thereof is described in detail hereinbelow.

(1) Method for Producing a Test Specimen (Length×Width×Thickness) is as Described Below.

Figure 2:
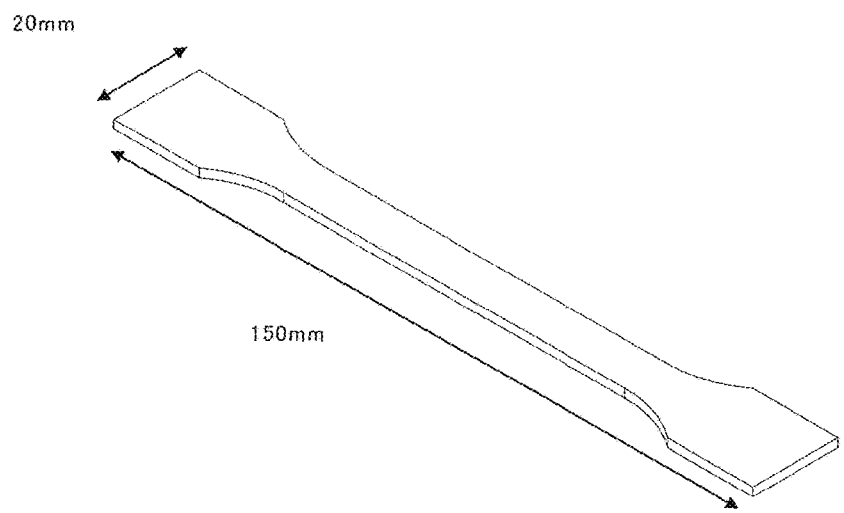
FIG. 2 is a diagram illustrating a test specimen.

Based on a dumbbell type: "Plastics—Multipurpose test specimen (JIS K7139)", a test specimen is prepared. The injection is molded to have a shape in which a total length is 150 mm, a width at both ends is 20 mm, a width at center part is 10 mm, a length at center part is 80 mm, and a thickness is 4 mm. In FIG. 2, a perspective view of the dumbbell type test specimen is shown.

(2) Tensile Test

Figure 3:
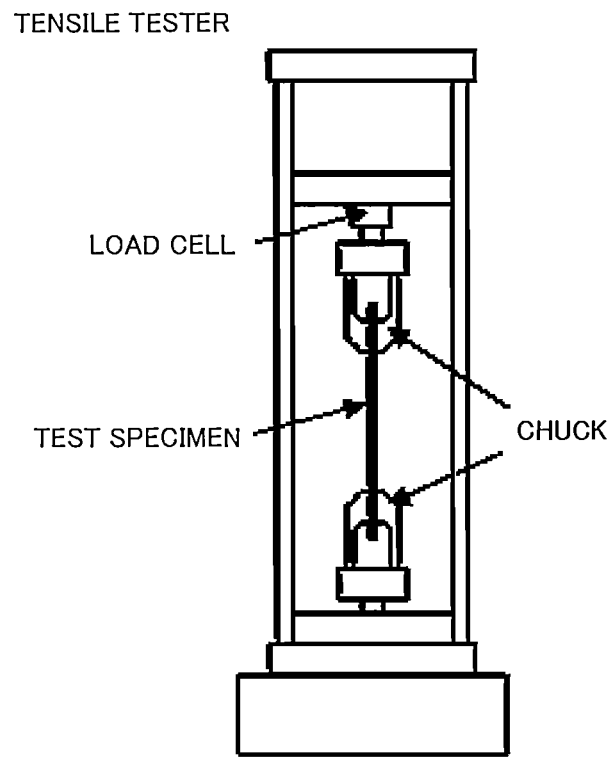
FIG. 3 is a diagram illustrating a tensile tester.

Tensile tests were performed based on "Plastics—Test methods for tensile properties, part 2: test conditions for molded, extrusion molded and injection molded plastics (JIS K7162)". Test specimens (dumbbell-shaped) are each sandwiched between an upper chuck and a lower chuck of a tensile tester (RTC-1310A manufactured by Toyo Seiki Seisaku-Sho, Ltd.), and then attached to the tester. The lower chuck is moved downward at a rate of 50 mm/min until the test specimen breaks. The tensile yield stress, the tensile yield deformation, the tensile break strength, and the tensile break deformation are determined. The schematic diagram of the tensile tester is shown in FIG. 3.

(3) Bending Property Test

Figure 4:
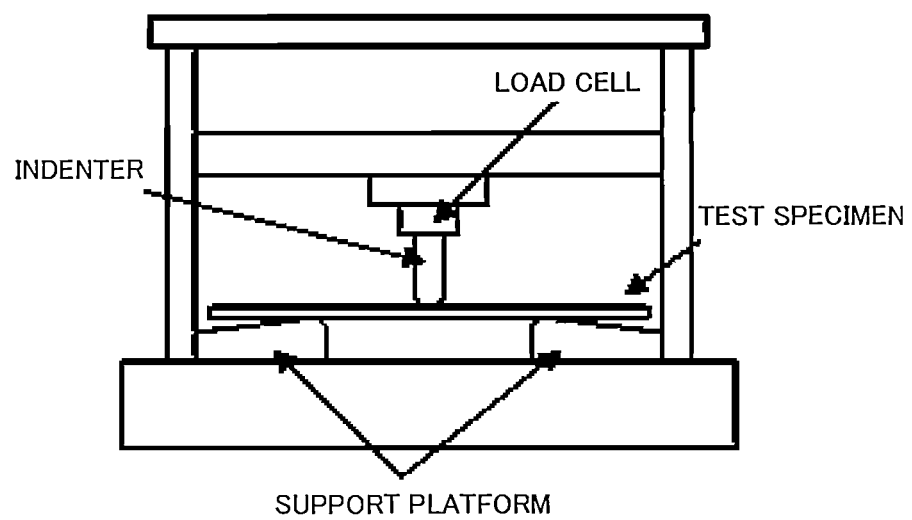
FIG. 4 is a diagram illustrating a bending property tester.

Bending property tests are performed based on "Plastics—Determination of bending properties (JIS K7171)". A test specimen (processed to dimensions of 80×10×2 mm by cutting both ends from a dumbbell-shaped test specimen) is installed on a support platform (span between support points of 34 mm) of a bending property tester (RTC-1310A manufactured by Toyo Seiki Seisaku-Sho, Ltd.). The test specimen is then pushed down from above and deformed by an indenter at a rate of 1 mm/min. The bending strength and the bending elastic modulus are checked. The schematic diagram of the bending property tester is shown in FIG. 4.

(4) Charpy Impact Strength Test

Figure 5:
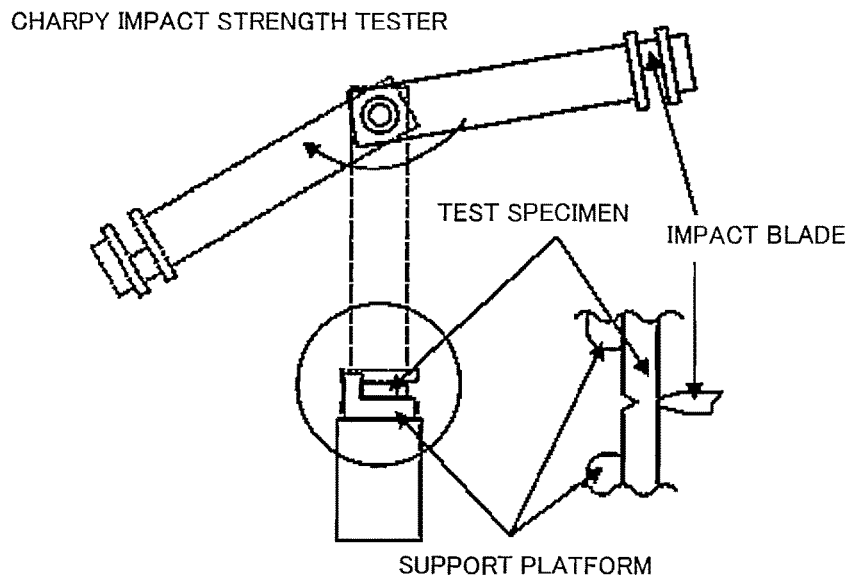
FIG. 5 is a diagram illustrating a Charpy impact strength tester.

Charpy impact strength tests are performed based on "Plastics—Determination of Charpy impact properties—part 1: non-instrumental impact test (JIS K7111-1)". A dumbbell-shaped test specimen is processed in advance to form of 1 eA (processed to dimensions of 80×10×2 mm by cutting both ends from a dumbbell-shaped test specimen, and a notch is then formed in the center). The test specimen is installed on a support platform of a Charpy impact tester (DG-CB manufactured by Toyo Seiki Seisaku-Sho, Ltd.), a hammer having so-called pendulum energy of 4.00 J is used to strike the test specimen with a rising angle of 150°, and the Charpy impact strength is determined. The schematic diagram of the Charpy impact strength tester is shown in FIG. 5.

(5) Measurement of Total Transmittance

Figure 6:
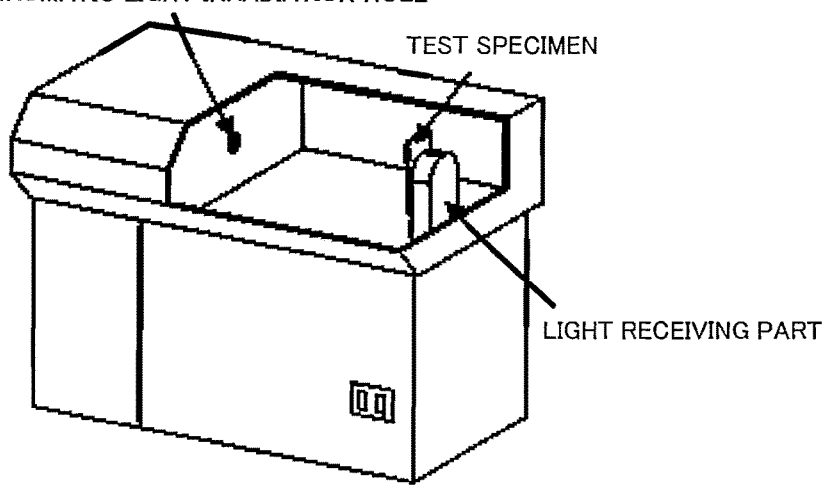
FIG. 6 is a diagram illustrating a total light transmittance tester.

Testing was performed based on "Testing methods for optical properties of plastics (JIS K7105)". A test specimen with thickness of 2 mm each installed in a test specimen installation location in front of the light receiving section of a recording spectrophotometer (Hitachi Spectrophotometer, U-4100 manufactured by Hitachi High-Technologies Corporation), and the spectral transmittance is measured in the wavelength region from 380 nm to 780 nm at a scan speed of 600 nm/min and a sampling interval of 1.00 nm. The measured spectral transmittance is converted to (visual) transmittance (using the conversion formula of JIS T8147), and this value is determined. The schematic diagram of the total transmittance tester is shown in FIG. 6.

[Mathematical Formula 1]
Calculation formula for visual transmittance
Value of spectral distribution of standard illuminant A
Photopic spectral luminous efficiency at viewing angle of 2 degrees
Spectral transmittance of test filter
Visual transmittance (%)

Meanwhile, JIS T8147: 2003 "Protective eyewear", the visual transmittance for the lenses of a protective eyewear is set at 85% or higher, and therefore the pass line for transmittance is deemed to be 85% or higher.

Visual transmittance is light visible to the eye (visible light) in the wavelength range from 380 nm to 780 nm, but the sensitivity of the human eye differs depending on the wavelength (for light of the same intensity, green and yellow light is perceived as bright, and purple and red light is perceived as dark). A weighted averaging is performed that emphasizes the transmittance for wavelengths having a high relative spectral luminous efficiency, and minimizes the transmittance for wavelengths having a low spectral luminous efficiency. A visual transmittance of 100% indicates colorless transparency.

UV rays are the light having a lower wavelength than visible light (380 nm or less). It is harmful to the eyes, and can cause keratitis and cataracts. Although not specified in JIS standards for protective eyewear, it is desirable that ultraviolet radiation not be transmitted.

(6) Load Deflection Temperature Test (HDT)

Figure 7:
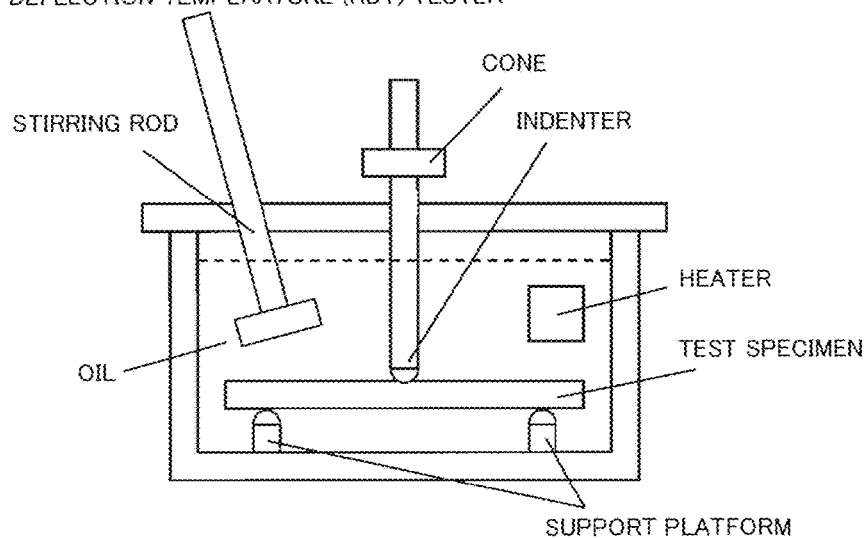
FIG. 7 is a diagram illustrating a load deflection temperature (HDT) tester.

The test is performed based on "Plastics—Method for measuring load deflection temperature (JIS K7191-1)." A test specimen (processed to dimensions of 80×10×2 mm by cutting both ends from a dumbbell-shaped test specimen is installed on a support platform of a HDT measurement device. A constant load (1.80 MPa and 8.00 MPa) was applied onto the test specimen, and the liquid (oil) inside the tester was heated under stirring. The temperature at which the test specimen is deflected by 0.5 mm was recorded. In FIG. 7, a schematic diagram of the load deflection temperature tester is shown.

(7) Chemical Resistance Test (Environmental Stress Crack Test)

A test specimen (dumbbell-shaped) is installed on a constant-deformation jig. The constant-deformation jig has a cross section of a semi-circular shape, and it is designed such that the center part of the test specimen installed on a curvature (R=198) receives a constant bending deformation (about 1.0%).

Figure 8:
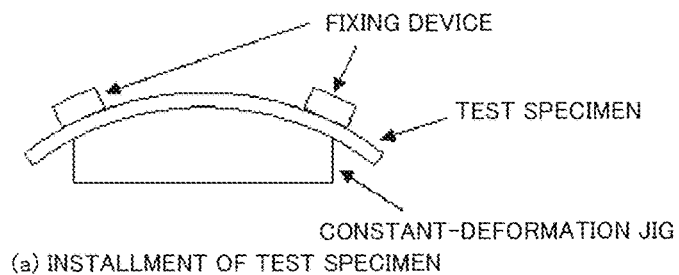
FIGS. 8(a) and 8(b) are diagrams illustrating an environmental stress crack tester.
Figure 8:
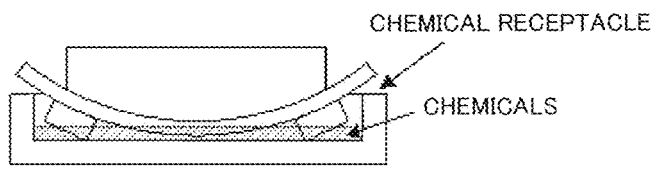

With regard to a test method, a constant-deformation jig is placed upside down and placed in a concave part of a chemical receptacle. A chemical is added to a hollow of the chemical receptacle such that the test specimen is brought into contact with the chemical, and it is left at room temperature for 3 hours. In FIGS. 8(a) and 8(b), schematic diagrams of the environmental stress crack tester are shown. After removing the test specimen followed by thorough cleansing and drying, a change in appearance of the test specimen before and after the impregnation was determined. The test specimen showing no cracks was also subjected to a tensile test to confirm the tensile strength retention ratio.

As for the test method, the determination was made in the same manner as above (2) Tensile test. By measuring the elongation at break, the influence of the chemicals not exhibited on the appearance was determined.

The tensile break elongation (mm) of the test specimen was obtained before and after the impregnation, and the evaluation was made based on the following criteria. The tensile strength retention ratio (%) was obtained as follows:

(Tensile deformation at break after impregnation)/(Tensile deformation at break before impregnation)×100.
⊙: 90% or higher
○: 70% or higher but lower than 90%
Δ: 25% or higher but lower than 70%
X: lower than 25%, or the tensile test cannot be performed due to the break.

As for the evaluation, one lower level is given when there is whiteness, yellowness, or cloudiness.

The environmental stress crack test is one chemical resistance test for checking environmental stress cracks (environmental stress fissures). Environmental stress cracks may occur, even if the chemical substance has no effect or minimal effect when adhered to a certain resin, when the chemical substance is adhered in a state where a force is applied (such as internal stress during molding or an external force such as a fastening stress), which may produce an effect in a short period of time or have an increased effect. Crack that occurs in this manner due to force and a chemical substance is termed environmental stress crack, and this test checks the presence of environmental stress cracks.

Meanwhile, in this test, extremely severe conditions are set in order to make the differences in chemical resistance of the resins more remarkable. In actual usages, it is extremely difficult to imagine that the resin would be in a state of continuous submerge in a chemical substance for 3 hours. Further, the effect of environmental stress crack increases as the forces on the resin are increased. In the case of a polycarbonate, if the test specimen is subjected to a strain of about 1.0%, then the internal stress is estimated to be 23 MPa. In documentation of resin makers, a residual stress of 8.3 Mpa is deemed a "strain check for a stand-alone molded item", which means a force much larger than this has been applied.

(8) Accelerated Weather Resistance Test

Figure 9:
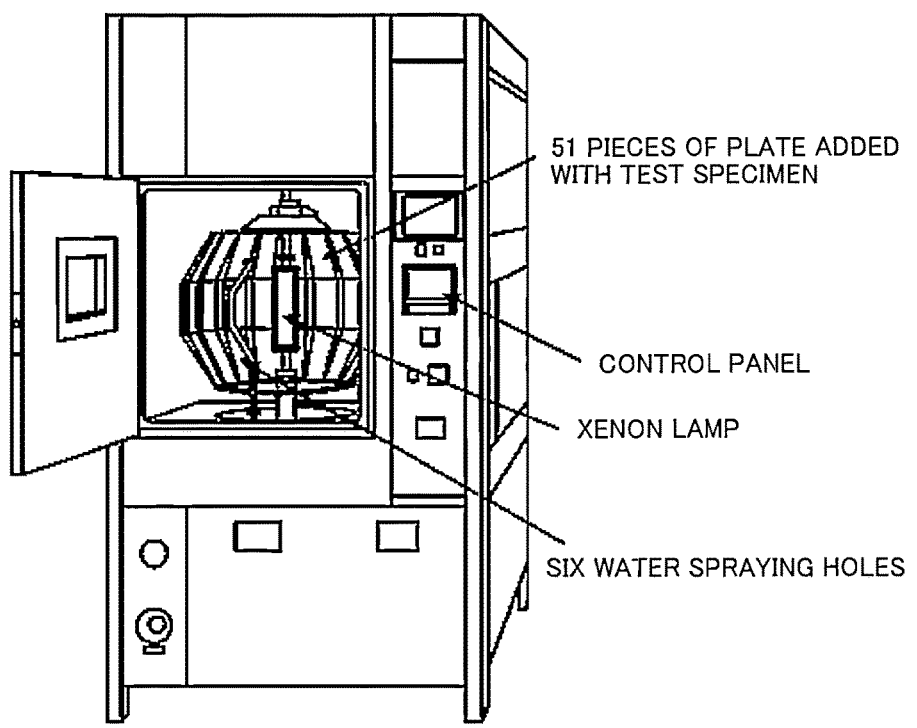
FIG. 9 is a diagram illustrating an accelerated weather resistance tester.

The test is performed based on "Plastics—Methods of exposure to laboratory light sources (JIS K7350-2)". Test specimens (dumbbell-shaped) are installed in an accelerated weather resistance tester (Super Xenon Weather Meter SX-75 manufactured by Suga Test Instruments Co., Ltd.) that uses a xenon lamp as a light source, and testing is then performed. After a prescribed period of time (100, 200, 300, 600, 1000, or 2000 hours) elapses, the test specimens are removed, and the changes in the physical properties of the test specimens before and after the weather resistance test are checked using the evaluation tests. The operating conditions for the tester include that the outdoor light filter is installed, the temperature inside the tank is not controlled, the humidity inside the tank is 50 (5%, and the black panel temperature is 63 (3 (C. Further, a rainfall condition is assumed and the water spray cycle is set such that spraying is conducted for 18 minutes and then halted for 102 minutes. In a test of a vehicle that is always left in an outdoor environment, 2000 hours of the accelerated weather resistance test is deemed to be equivalent to 10 years. In FIG. 9, a schematic diagram of the accelerated weather resistance tester is shown.

(9) Planar Impact Test

Based on "Plastics—Determination of puncture impact behavior of rigid plastics—Part 2: Instrumented impact testing JIS K7211-2)", the test was performed. A test specimen (150 (150 (2 mm) molded by injection molding is placed on a support platform with receiving diameter of 40 mm and fixed with a pressing plate. Then, a striker with the diameter of 20 mm is collided at 4.4 m/sec to the test specimen. The displacement when the striker penetrates the test specimen is measured with a displacement sensor and the load is measured with a load cell. From the displacement-load graph, the energy required for penetration is obtained. The energy required from the start of the penetration of the striker through the specimen to the maximum load is designated as maximum point energy [J], and the total energy required until the load becomes the half of it is designated as puncture energy [J].

(10) Measurement of Melt Viscosity

Measurement can be made based on "Plastics—Determination of the fluidity of plastics using capillary and slit-die rheometers (JIS K7199)". For the measurement, the capillograph 1D "PMD-C" manufactured by Toyo Seiki Seisaku-Sho, Ltd was used. The measurement conditions include that a capillary with L=10.0 mm and D=phi 1.0 mm was used and the test was performed at 280° C.

(11) Analysis of PC Ratio Based on FT-IR

The measurement was performed based on FT-IR (Fourier transformed infrared spectroscopy). For the measurement, IRPrestage-21 manufactured by Shimadzu Corporation was used. A 10% range of the surface of the test specimen in the thickness direction was scraped off with a file, and the content ratio of the polycarbonate resin in that range was analyzed.

(12) Helmet Impact Absorption Test: For Use Against Flying/Dropping

Test of impact absorption by protective cap: for use against flying/dropping is performed according to the impact absorption I test as a performance test based on the standard determination of Labor Safety and Hygiene Act. After exposing a protective cap to the predetermined exposure conditions, the protective cap after exposure was put on a human head model. Then, by dropping a 5 kg hemispheric striker toward the top part of the protective cap from a height of 1 m in a direction vertical to the protective cap, the impact load applied to the human head model was measured.

Figure 13:
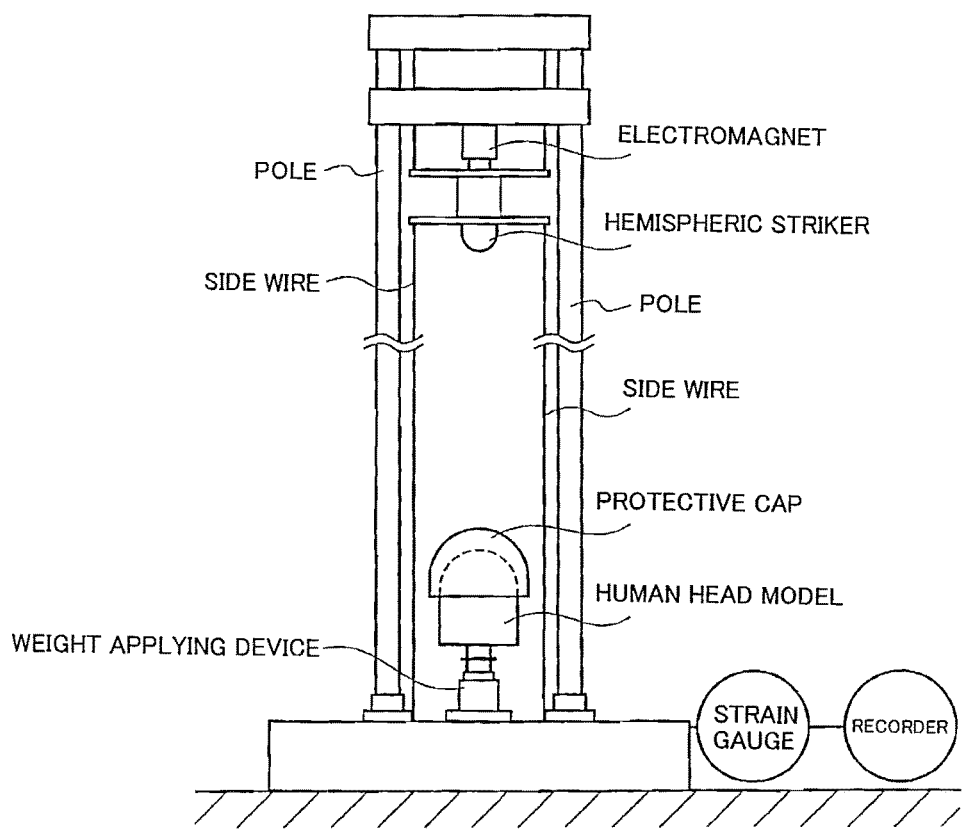
FIG. 13 is a diagram illustrating a helmet impact absorption tester (for use against flying/dropping).

The exposure conditions of the protective cap include three conditions of low temperature exposure (−10° C.), high temperature exposure (50° C.), and exposure by impregnation in water (21° C.). Those having 4.9 kN or less for the maximum impact load applied to a human head model were found to be "Pass." As for the hemispheric striker, a steel material satisfying SS400 standard defined by JIS G3101 (Rolled steels for a general structure) is used and a striker having a hemispheric impact surface with diameter of 48 mm is used. Meanwhile, for the impact absorption test: for use against flying/dropping, after being exposed under the exposure conditions of high temperature exposure (50° C.), low temperature exposure (−10° C.), or exposure by impregnation in water (21° C.), within one minute the hemispheric striker is dropped toward the protective cap and the test is completed. In FIG. 13, the schematic diagram of the helmet impact absorption tester—for use against flying/dropping is shown.

(13) Helmet Impact Absorption Test: For Protection at Falling

Test of impact absorption by protective cap: for protection at falling is performed according to the impact absorption II test as a performance test based on the standard determination of Labor Safety and Hygiene Act. After exposing a protective cap to the predetermined exposure conditions, the protective cap after exposure is put on a human head model, in which the center line is tilted by 30 degrees relative to the horizon, such that the impact point is at the front part of the head and the rear part of the head of the protective cap. Then, by dropping a 5 kg planar striker toward the front part and rear part of the protective cap from a height of 1 m in a direction vertical to the protective cap, the impact load applied to the human head model was measured.

Figure 14:
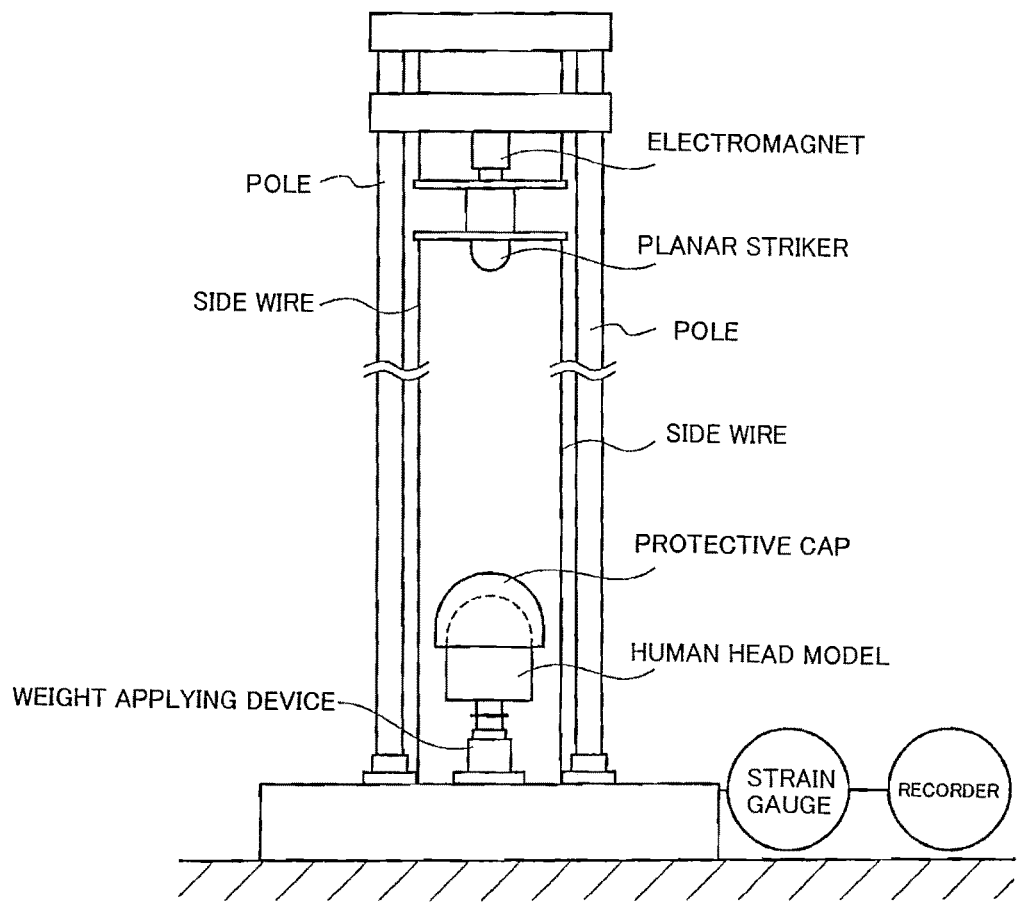
FIG. 14 is a diagram illustrating a helmet impact absorption tester (for protection at falling).

The exposure conditions of the protective cap include three conditions of low temperature exposure (−10° C.), high temperature exposure (50° C.), and exposure by impregnation in water (21° C.). Those having 9.81 kN or less of the maximum impact load that is applied to a human head model, and those having the impact load of 7.35 kN or more does not continue for 3/1000 second or longer, and the impact load of 4.9 kN or more does not continue for 4.5/1000 second or longer were found to be "Pass." As for the planar striker, a steel material satisfying SS400 standard defined by JIS G3101 (Rolled steels for a general structure) is used and a striker having a planar impact surface with the diameter of 127 mm is used. Meanwhile, for the impact absorption test: for protection at falling, after exposure according to high temperature exposure (50° C.), low temperature exposure (−10° C.), or exposure by impregnation in water (21° C.), within 3 minutes the planar striker is dropped toward the protective cap and the test is completed. In FIG. 14, the schematic diagram of the helmet impact absorption tester for protection at falling is shown.

(14) Helmet Penetration Resistance Test: For Use Against Flying/Dropping

Figure 15:
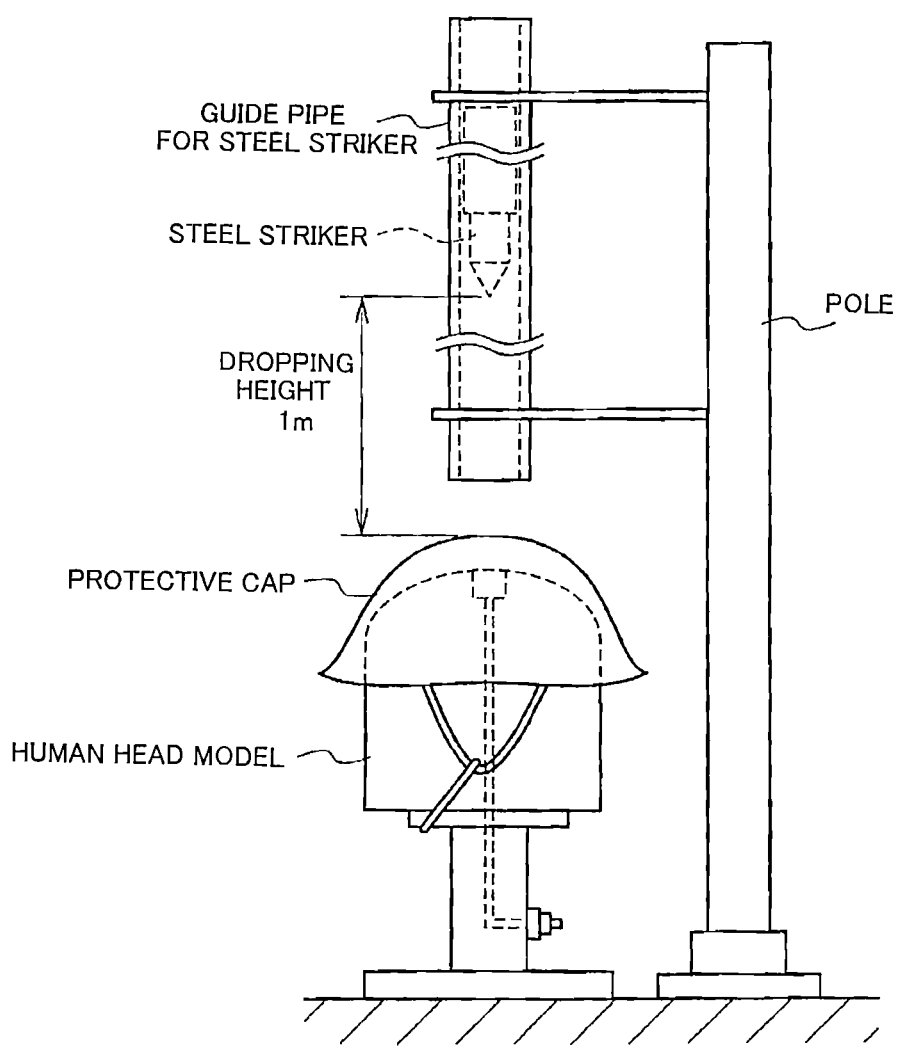
FIG. 15 is a diagram illustrating a helmet penetration resistance tester (for use against flying/dropping).

Test of penetration resistance by protective cap: for use against flying/dropping is performed according to the penetration resistance test (penetration I test) as a performance test based on the standard determination of Labor Safety and Hygiene Act. For the penetration resistance test, a 3 kg conical striker having the tip angle of 60 degrees and a conical shape is freely dropped at room temperature toward the protective cap put on a human head model from a height of 1 m in a direction vertical to the protective cap, toward four areas within a circumference having diameter of 100 mm in which the top part of the protective cap is a center part. Those not resulting in a contact of the tip of the conical striker with the human head model were found to be "Pass." In FIG. 15, the schematic diagram of the helmet penetration resistance tester—for use against flying/dropping—is shown.

(15) Helmet Penetration Resistance Test: For Protection at Falling

Figure 16:
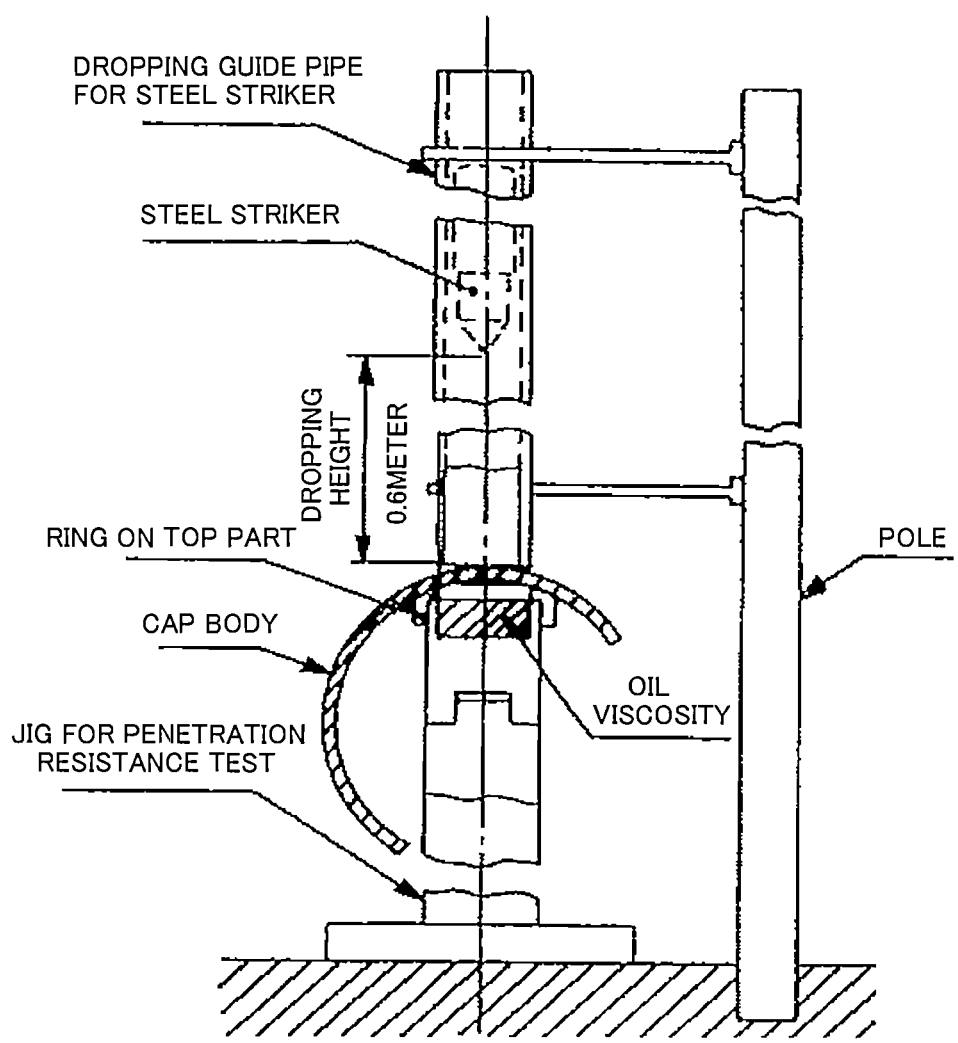
FIG. 16 is a diagram illustrating a helmet penetration resistance tester (for protection at falling).

Test of penetration resistance by protective cap: for protection at falling is performed according to the penetration resistance test (penetration II test) as a performance test based on the standard determination of Labor Safety and Hygiene Act. The penetration resistance test was performed by free dropping at room temperature a 1.8 kg conical striker having the tip angle of 60 degrees and a conical shape toward the protective cap, which has been installed on a top part ring of a jig for test such that the falling point becomes the front part, rear part, or two lateral parts of the head of the cap body shell, from a height of 0.6 m in a direction vertical to the protective cap, toward the front part, rear part, and two lateral parts of the head of the protective cap. After dropping of the conical striker, the distance from the top end of the top part ring of the jug for test to the deepest part in the concave region inside the cap body, or when the tip of the conical striker penetrates the cap body, the distance to the tip of the conical striker was measured. Those showing the vertical distance of 15 mm or less are found to be "Pass." In FIG. 16, the schematic diagram of the helmet penetration resistance tester—for use at falling—is shown.

(Molded Body)

The molded body according to one embodiment of the present invention consists of the resin composition described above.

As for the molded body, an external resin member for outdoor use, a helmet cap body, a face protection shield of a helmet, a sports goggle, a lens for eyeglasses, a (integrated) lens for eyeglasses, a temple, and a frame of eyeglasses, an outer handle (outside door knob for an automobile), an inner door handle (inside door knob for an automobile), a mechanical component, a cover of an electric power tool, a resin glazing member, or the like can be provided.

Examples of the external resin member for outdoor use include a fence, a pot, and an external wall.

Examples of the mechanical component include a frame, a shaft, and a gear.

The resin glazing member is a substitute member for glass/metal, and examples thereof include a resin glass for construction and a liquid vessel.

One exemplary molded body of the present invention consists of a resin composition which contains the aforementioned poly(1,4-cyclohexylene dimethylene terephthalate) copolyester resin and polycarbonate resin, and optionally a UV absorbing agent and/or a hydrolysis inhibitor. The resin composition may further suitably contain an additive. For example, by forming a molded body with a resin composition containing a coloring material, a colored molded body can be provided. In particular, by producing a helmet cap body with a resin composition containing a coloring material, an industrial helmet can be favorably provided.

The molded body according to the present invention is preferably a molded body consisting of the resin composition described above, and the content of the poly(1,4-cyclohexylene dimethylene terephthalate) copolyester resin relative to the polycarbonate resin is higher in the surface layer than the average value of the molded body as a whole.

Accordingly, the impact resistance of a molded body as a whole can be enhanced due to the property of the polycarbonate resin, and due to the poly(1,4-cyclohexylene dimethylene terephthalate) copolyester resin in a surface layer of the molded body, the chemical resistance can be enhanced. Once the chemical resistance is enhanced in a surface layer of a molded body, the chemical resistance of a molded body as a whole can be guaranteed when the molded body is exposed to chemicals.

As described herein, the surface layer of the molded body means the region from the surface to 10% of the length in the thickness direction of the molded body.

The average value of the content of the poly(1,4-cyclohexylene dimethylene terephthalate) copolyester resin relative to the polycarbonate resin in the molded body as a whole can be obtained as a weight ratio from the addition amount of the resins. For example, it is preferable that the ratio in the surface layer be 70% by weight or lower than the average value. More preferably, it is 35% by weight or lower, and even more preferably 20% by weight or lower.

EXAMPLES

Hereinbelow, Examples of the present invention are described. The present invention is not limited to the following Examples.

The components used in the following Examples are as described below.

TRITAN "TX1001": poly(1,4-cyclohexylene dimethylene terephthalate) copolyester resin, manufactured by Eastman Chemical Company, TRITAN of general grade. TRITAN of general grade for injection.

TRITAN "TX1000": poly(1,4-cyclohexylene dimethylene terephthalate) copolyester resin, manufactured by Eastman Chemical Company.

PC "E2000UR": Polycarbonate resin, manufactured by Mitsubishi Engineering-Plastics Corporation, low grade. General polycarbonate for extrusion.

PC "302-4": polycarbonate resin, manufactured by Sumika Styron Polycarbonate Limited, low grade.

PC "S2000U": Polycarbonate resin, manufactured by Mitsubishi Engineering-Plastics Corporation, medium grade.

PC "302-15": Polycarbonate resin, manufactured by Sumika Styron Polycarbonate Limited, high grade.

UV absorbing agent "UV-3638": manufactured by Cytec Company, CYASORB UV-3638.

Hydrolysis inhibitor "LA-1": CARBODILITE "LA-1", manufactured by Nisshinbo Chemical Inc.

Further, with regard to the step for polymer alloying of TRITAN as a poly(1,4-cyclohexylene dimethylene terephthalate) copolyester resin and PC as a polycarbonate resin in the following Examples, each resin is added to a vessel, melt, kneaded, and extruded at a temperature of 270 to 280 (C under stirring of 150 to 180 rpm, unless specifically described otherwise.

1. Test for Addition Amount of Resin Composition

In the following, the polymer alloying was performed at a specific ratio using TRITAN "TX1001" and PC "E2000UR", and the test was performed for the obtained resin composition. The details are shown below. The results are shown in Table 1.

Comparative Example 1

The polymer alloying was performed using TRITAN "TX1001" and PC "E2000UR" at a specific ratio of 100 to 0 (weight ratio), and various tests were performed for the obtained composition.

Example 1

The polymer alloying was performed using TRITAN "TX1001" and PC "E2000UR" at a specific ratio of 90 to 10 (weight ratio), and various tests were performed for the obtained composition.

Example 2

The polymer alloying was performed using TRITAN "TX1001" and PC "E2000UR" at a specific ratio of 80 to 20 (weight ratio), and various tests were performed for the obtained composition.

Example 3

The polymer alloying was performed using TRITAN "TX1001" and PC "E2000UR" at a specific ratio of 70 to 30 (weight ratio), and various tests were performed for the obtained composition.

Example 4

The polymer alloying was performed by adding 0.5 parts by weight of the UV absorbing agent "UV-3638" and 0.25 parts by weight of the hydrolysis inhibitor "LA-1" to 100 parts by weight of TRITAN "TX1001" and PC "E2000UR"

at a specific ratio of 70 to 30 (weight ratio), and various tests were performed for the obtained composition.

Example 5

The polymer alloying was performed by adding 0.5 parts by weight of the UV absorbing agent "UV-3638", 0.25 parts by weight of the hydrolysis inhibitor "LA-1", and 2 parts by weight of a white pigment (titan oxide) to 100 parts by weight of TRITAN "TX1001" and PC "E2000UR" at a specific ratio of 70 to 30 (weight ratio), and various tests were performed for the obtained composition.

agent manufactured by Henkel Japan Corporation. NEOS Clear Cut is "HS-33A" manufactured by NEOS COMPANY LIMITED.

For the chemical resistance test, an environmental stress crack test was performed by preparing a dumbbell-shaped test specimen with a thickness of 2 mm using the test material and having constant-deformation of about 0.5%, impregnation condition was 3 hours and N number of 3 (results are the average value). The evaluation criteria are shown below. Other conditions are based on "(7) Environmental stress crack test".

TABLE 1

| | | | | | | | | |
|---|---|---|---|---|---|---|---|---|
| TX1001 (TRITAN of general grade for injection) | | | 100 | 90 | 80 | 70 | 70 | 70 |
| EZ000UR (General polycarbonate for extrusion) | | | 0 | 10 | 20 | 30 | 30 | 30 |
| UV-3638 | | | | | | | 0.5 | 0.5 |
| LA-1 | | | | | | | 0.25 | 0.25 |
| Colored | | | | | | | | White |
| Measurement of specific gravity (replacement in water) | | | 1.184 | 1.187 | 1.188 | 1.189 | — | — |
| HDT Measurement | 0.5 mm Deflection temperature °C. | Load 1.80 MPa | 88.4 | 91.1 | 92.7 | 95.3 | — | — |
| | | Load 8.00 MPa | 77.3 | 79.9 | 80.9 | 82.7 | — | — |
| Transmittance | Visual transmittance [%] | | 88.6 | 88.6 | 89.0 | 89.0 | 88.9 | — |
| | 1% Rising wavelength [nm] | | 310 | 365 | 375 | 380 | 390 | — |
| Tensile test | Tensile modulus [MPa] | Room temperature | 1614 | 1638 | 1651 | 1800 | 1768 | 1967 |
| | | −10° C. | 1690 | 1700 | 1790 | 1910 | 1930 | 1950 |
| | | −15° C. | 1650 | 1640 | 1760 | 1810 | 1890 | 1940 |
| | Yield stress [MPa] | Room temperature | 44.3 | 46.0 | 48.2 | 50.3 | 51.2 | 52.0 |
| | | −10° C. | 58.5 | 60.0 | 62.2 | 63.8 | 64.9 | 65.5 |
| | | −15° C. | 60.7 | 62.3 | 64.7 | 66.4 | 67.2 | 67.9 |
| | Deformation at yield point [%] | Room temperature | 3.8 | 3.8 | 4.0 | 3.9 | 3.6 | 3.7 |
| | | −10° C. | 7.6 | 7.8 | 7.7 | 7.5 | 7.4 | 7.4 |
| | | −15° C. | 8.0 | 8.1 | 8.1 | 7.8 | 7.7 | 7.5 |
| | Stress at break point [MPa] | Room temperature | 47.6 | 49.9 | 55.8 | 59.9 | 57.6 | 54.9 |
| | | −10° C. | 56.7 | 61.9 | 70.7 | 79.6 | 74.1 | 66.3 |
| | | −15° C. | 58.1 | 60.9 | 71.0 | 76.8 | 71.6 | 65.6 |
| | Deformation at break point [%] | Room temperature | 98.6 | 90.5 | 95.2 | 101.3 | 104.0 | 96.2 |
| | | −10° C. | 77.0 | 77.0 | 86.0 | 81.0 | 94.0 | 84.0 |
| | | −15° C. | 73.0 | 72.0 | 81.0 | 88.0 | 87.0 | 79.0 |
| Bending test | Bending modulus [MPa] | Room temperature | 1851.1 | 2049.9 | 2068.7 | 2103.6 | 2195.9 | 2238.1 |
| | Yield stress [MPa] | | 76.3 | 80.8 | 85.0 | 86.7 | 90.6 | 91.3 |
| | Yield deformation [%] | | 5.7 | 5.9 | 5.9 | 5.9 | 5.8 | 5.8 |
| Charpy | Impact strength [kJ/m2] | Room temperature | NB | NB | 75.1 | 74.2 | 73.8 | 74.5 |
| | | −10° C. | NB | NB | 89.5 | 83.4 | 86.3 | 72.0 |
| | | −15° C. | NB | NB | 82.6 | 72.8 | 83.4 | 66.2 |

2. Chemical Resistance Test of Resin Composition

Example 6

As a test sample, a resin composition obtained by polymer alloying of TRITAN "TX1001" and PC "E2000UR" at a specific a ratio of 70 to 30 (weight ratio) was prepared. By using the test sample, the chemical resistance test was performed with sodium hydroxide (10% by weight aqueous solution), nitric acid (40% by weight aqueous solution), ethanol, NEOS Clear Cut (10% by weight aqueous solution), which is a water soluble cutting oil, and Henkel P3 (3% by weight aqueous solution), which is a cylinder cleansing The tensile break elongation (%) of the test specimen was obtained before and after the impregnation, and the evaluation was made based on the following criteria. The tensile break elongation (%) was obtained as follows: tensile break elongation (%)=(Value after impregnation)/(Value before impregnation)×100.
⊙: 85% or higher
◯: 70% or higher but lower than 85%
Δ: 30% or higher but lower than 70%
X: lower than 30%, or the tensile test cannot be performed due to break.

As for the evaluation, one lower level is given when there is whiteness, yellowness, or cloudiness.

Comparative Example 2

As Comparative Example, the resin composition of 100% by weight of PC "E2000UR" was also subjected to the test.

The results are shown in Table 2. In Table 2, the resin composition of Example 6 is described as "Alloy" and the resin composition with 100% by weight of PC of Comparative Example 2 is described as "PC."

TABLE 2

| Materials | | Appearance | Comparison of physical properties Tensile break elongation [%] | Evaluation |
|---|---|---|---|---|
| Sodium hydroxide 10% | PC | No problem | 95.6 | ◎ |
| | Alloy | No problem | 103.4 | ◎ |
| Nitric acid 40% | PC | Yellowing* | 73.3 | Δ |
| | Alloy | Yellowing* | 108.7 | ○ |
| Ethanol | PC | No problem | 75.6 | ○ |
| | Alloy | No problem | 111.1 | ◎ |
| Water soluble cutting oil NEOS Clear Cut 10% | PC | No problem | 71.1 | ○ |
| | Alloy | No problem | 108.0 | ◎ |
| Cylinder cleansing agent Henkel P3 3% | PC | No problem | 60.5 | Δ |
| | Alloy | No problem | 110.6 | ◎ |

*All showed a slight yellowing, but PC has a significant yellowing.

3. Test for Melt Viscosity Ratio of Resin

[Resin Types]

Resin types used for the test are shown below. CPE: TRITAN "TX1000": TRITAN of general grade.
PC1: PC "302-4": low grade. Polycarbonate with MFR values of 4 g/10 min at 300° C. and 1.2 kg.
PC2: PC "E2000UR": low grade. Polycarbonate with MFR values of 5 g/10 min at 300° C. and 1.2 kg.
PC3: PC "S2000U": medium grade. Polycarbonate with MFR values of 15 g/10 min at 300° C. and 1.2 kg.
PC4: PC "302-15": high grade. Polycarbonate with MFR values of 15 g/10 min at 300° C. and 1.2 kg.

[Measurement of Melt Viscosity Ratio of Resin]

The melt viscosity was measured for each resin described above. The melt viscosity of the resin was measured based on "Plastics—Determination of the fluidity of plastics using capillary and slit-die rheometers (JIS K7199)." Schematic cross-sectional view of the tester used for performing this measurement is shown in FIG. 10.

A resin pellet as a sample was placed in the barrel of the tester and preheated until it reaches the defined temperature (280° C.). After that, by operating the piston at a constant rate, the resin was extruded. From the piston rate and inner pressure at that time, the shear rate and melt viscosity of the resin were obtained. Meanwhile, a capillary die with L=10.0 mm and D=ϕ1.0 mm was used.

Figure 11:
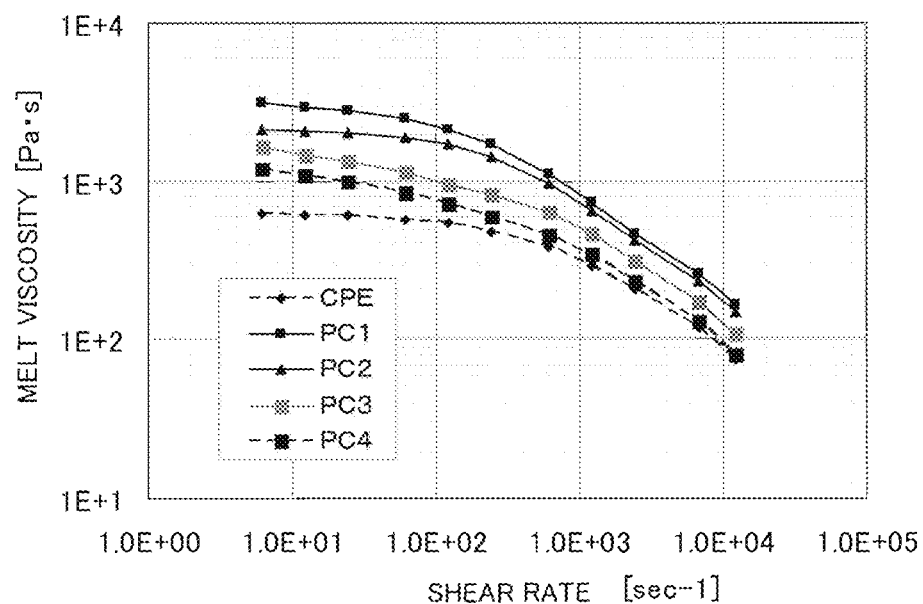
FIG. 11 is a diagram illustrating a melt viscosity at 280° C. with respect to a shear rate of a resin composition.
Figure 12:
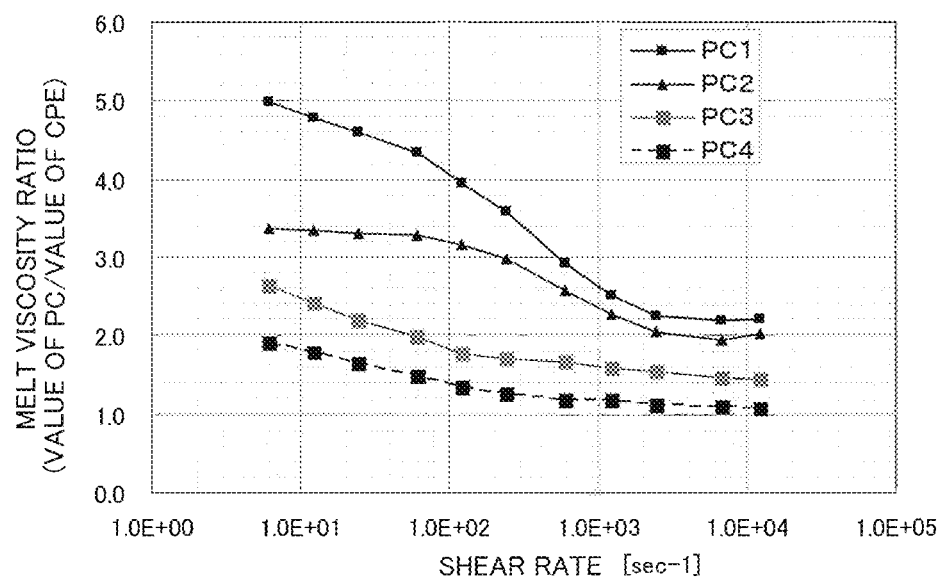
FIG. 12 is a diagram illustrating a melt viscosity ratio at 280° C. with respect to the shear rate of the resin composition.

The measured results are shown in FIG. 11. FIG. 11 is a graph illustrating the melt viscosity with respect to the shear rate. From the results, the melt viscosity ratio of each of PC1 to 4 ((melt viscosity of PC resin)/(melt viscosity of CPE)) was obtained for CPE (TRITAN), and showed in FIG. 12. FIG. 12 is a graph illustrating the melt viscosity ratio with respect to the shear rate.

As shown in FIG. 12, the melt viscosity of each of PC1 to 4 for CPE (TRITAN) was as follows: 4.9 for PC1, 3.4 for PC2, 2.1 for PC3, and 1.8 for PC4 at 280° C. and a shear rate of 10 (sec$^{-1}$).

<A. Test for Types and Addition Ratio of Resin Composition and Additives>

The components used in the following Examples are described below.

(1) CPE: copolyester resin containing dimethyl terephthalate (DMT) as an acid component and 1,4-cyclohexane dimethanol (CHDM) and 2,2,4,4-tetramethyl-cyclobutandiol (TMCD) as a glycol component, manufactured by Eastman Chemical Company, TRITAN of general grade. TRITAN "TX1000".

(2) PC1: General polycarbonate resin with an MFR value (300° C., 1.2 kg) of 4.0. PC "302-4".

(3) PC2: General polycarbonate resin with an MFR value (300° C., 1.2 kg) of 5.0. PC "E2000UR".

(4) PC3: General polycarbonate resin with an MFR value (300° C., 1.2 kg) of 10.0. PC "S2000U".

(5) PC4: General polycarbonate resin with an MFR value (300° C., 1.2 kg) of 15.0. PC "302-15".

(6) UV absorbing agent: benzoxazine compound, manufactured by Cytec Company, CYASORB UV-3638 (2,2'-p-phenylene bis(3,1-benzoxazin-4-one).

(7) Hydrolysis inhibitor: carbodiimide compound, manufactured by Nisshinbo Chemical Inc., LA-1 (poly(4,4'-methylene biscyclohexyl carbodiimide)).

Planar Impact Test and Chemical Resistance Test

Example A1

It is a result of the planar impact test and chemical resistance test of the test specimen which has been prepared from a mixture of CPE and PC1 (5% by weight).

Example A2

It is a result of the planar impact test and chemical resistance test of the test specimen which has been prepared from a mixture of CPE and PC1 (20% by weight).

Example A3

It is a result of the planar impact test and chemical resistance test of the test specimen which has been prepared from a mixture of CPE and PC1 (30% by weight).

Example A4

It is a result of the planar impact test and chemical resistance test of the test specimen which has been prepared from a mixture of CPE and PC1 (40% by weight).

Comparative Example A1

It is a result of the planar impact test and chemical resistance test of the test specimen which has been prepared from CPE only.

Comparative Example A2

It is a result of the planar impact test and chemical resistance test of the test specimen which has been prepared from a mixture of CPE and PC1 (3% by weight).

Comparative Example A3

It is a result of the planar impact test and chemical resistance test of the test specimen which has been prepared from a mixture of CPE and PC1 (50% by weight).

The results of the planar impact test and chemical resistance test described above are shown in Table 3. The test methods are as defined above.

TABLE 3

Planar impact test and chemical resistance test

| | Example A1 | Example A2 | Example A3 | Example A4 | Comparative Example A1 | Comparative Example A2 | Comparative Example A3 |
|---|---|---|---|---|---|---|---|
| <Raw materials> | | | | | | | |
| CPE Addition ratio [% by weight] | 95 | 80 | 70 | 60 | 100 | 97 | 50 |
| PC Addition ratio [% by weight] | 5 | 20 | 30 | 40 | — | 3 | 50 |
| Types of PC | PC 1 | PC 1 | PC 1 | PC 1 | — | PC 1 | PC 1 |
| MFR of PC [g/10 min](300° C., 1.2 kg) | 4 | 4 | 4 | 4 | — | 4 | 4 |
| <Planar impact test> | | | | | | | |
| 23° Puncture energy [J] | 111.6 | 114.3 | 123.0 | 126.7 | 111.1 | 109.8 | 131.3 |
| −10° C. Energy at maximum impact [J] | 100.3 | 103.0 | 107.0 | 110.6 | 90.3 | 92.1 | 114.9 |
| <Chemical resistance test> | | | | | | | |
| 1. Ammonia water | | | | | | | |
| Change in appearance | No problem | No problem | No problem | No problem | No problem | No problem | No problem |
| Tensile strength retention ratio | 96.2 | 91.3 | 89.5 | 81.1 | 101.5 | 94.2 | 9.9 |
| Evaluation | ⊚ | ⊚ | ○ | ○ | ⊚ | ⊚ | X |
| 2. Sodium hydroxide 10% | | | | | | | |
| Change in appearance | No problem | No problem | No problem | No problem | No problem | No problem | Break |
| Tensile strength retention ratio | 85.5 | 31.0 | 25.1 | 18.7 | 103.8 | 89.9 | 0.0 |
| Evaluation | ○ | Δ | Δ | X | ⊚ | ⊚ | X |
| 3. Nitric acid 40% | | | | | | | |
| Change in appearance | No problem | No problem | No problem | No problem | No problem | No problem | Slightly yellowing |
| Tensile strength retention ratio | 99.8 | 102.7 | 105.1 | 85.5 | 99.8 | 101.4 | 75.5 |
| Evaluation | ⊚ | ⊚ | ⊚ | ○ | ⊚ | ⊚ | Δ |
| 4. Water soluble cutting oil | | | | | | | |
| Change in appearance | No problem | No problem | No problem | No problem | No problem | No problem | No problem |
| Tensile strength retention ratio | 95.5 | 93.3 | 80.1 | 73.3 | 103.8 | 95.7 | 30.2 |
| Evaluation | ⊚ | ⊚ | ○ | ○ | ⊚ | ⊚ | Δ |
| 5. Deodorant for clothes | | | | | | | |
| Change in appearance | No problem | No problem | No problem | No problem | No problem | No problem | No problem |
| Tensile strength retention ratio | 95.4 | 92.8 | 89.1 | 76.4 | 99.1 | 96.4 | 44.3 |
| Evaluation | ⊚ | ⊚ | ○ | ○ | ⊚ | ⊚ | Δ |

Charpy Impact Test Before and after Weather Resistance Test

Example A5

It is a result of a Charpy impact test before and after weather resistance test for the test specimen, which has been prepared by adding 0.05 parts by weight of a UV absorbing agent and 0.05 parts by weight of a hydrolysis inhibitor, that is, 0.10 parts by weight in total, to 100 parts by weight of the mixture of CPE and PC1 (30% by weight).

Example A6

It is a result of a Charpy impact test before and after weather resistance test for the test specimen, which has been prepared by adding 0.50 parts by weight of a UV absorbing agent and 0.50 parts by weight of a hydrolysis inhibitor, that is, 1.00 parts by weight in total, to 100 parts by weight of the mixture of CPE and PC1 (30% by weight).

Example A7

It is a result of a Charpy impact test before and after weather resistance test for the test specimen, which has been prepared by adding 1.00 part by weight of a UV absorbing agent and 1.00 part by weight of a hydrolysis inhibitor, that is, 2.00 parts by weight in total, to 100 parts by weight of the mixture of CPE and PC1 (30% by weight).

Example A8

It is a result of a Charpy impact test before and after weather resistance test for the test specimen, which has been prepared by adding 3.00 parts by weight of a UV absorbing agent and 3.00 parts by weight of a hydrolysis inhibitor, that is, 6.00 parts by weight in total, to 100 parts by weight of the mixture of CPE and PC1 (30% by weight).

Reference Example A1

It is a result of a Charpy impact test before and after weather resistance test for the test specimen, which has been prepared from the mixture of CPE and PC1 (30% by weight) without containing a UV absorbing agent and a hydrolysis inhibitor.

Reference Example A2

It is a result of a Charpy impact test before and after weather resistance test for the test specimen, which has been prepared by adding 3.50 parts by weight of a UV absorbing agent and 3.50 parts by weight of a hydrolysis inhibitor, that is, 7.00 parts by weight in total, to 100 parts by weight of the mixture of CPE and PC1 (30% by weight).

Example A9

It is the result of a Charpy impact test before and after weather resistance test for the test specimen, which has been prepared by adding 2.00 parts by weight of a UV absorbing agent only to 100 parts by weight of the mixture of CPE and PC1 (30% by weight).

Example A10

It is the result of a Charpy impact test before and after weather resistance test for the test specimen which has been prepared by adding 2.00 parts by weight of a hydrolysis inhibitor only to 100 parts by weight of the mixture of CPE and PC1 (30% by weight).

The results of a Charpy impact test before and after weather resistance test are shown in Table 4. The test methods are as defined above.

Chemical Resistance Test

Example A11

It is the result of a chemical resistance test for the test specimen which has been prepared with a mixture of CPE and PC1 (30% by weight).

Example A12

It is the result of a chemical resistance test for the test specimen which has been prepared with a mixture of CPE and PC2 (30% by weight).

Example A13

It is the result of a chemical resistance test for the test specimen which has been prepared with a mixture of CPE and PC3 (30% by weight).

Reference Example A3

It is the result of a chemical resistance test for the test specimen which has been prepared with a mixture of CPE and PC4 (30% by weight).

The results of the aforementioned chemical resistance test are shown in Table 5. The test methods are as defined above.

TABLE 4

Charpy impact test before and after weather resistance test

| | Example A5 | Example A6 | Example A7 | Example A8 | Reference Example A1 | Reference Example A2 | Example A9 | Example A10 |
|---|---|---|---|---|---|---|---|---|
| <Raw materials> | | | | | | | | |
| CPE Addition ratio [% by weight] | 80 | 80 | 80 | 80 | 80 | 80 | 80 | 80 |
| PC component ratio [% by weight] | 20 | 20 | 20 | 20 | 20 | 20 | 20 | 20 |
| Types of PC | PC1 | PC1 | PC1 | PC1 | PC1 | PC1 | PC1 | PC1 |
| <Anti-weathering agent> | | | | | | | | |
| UV absorbing agent [parts by weight] | 0.05 | 0.50 | 1.00 | 3.00 | 0.00 | 3.50 | 2.00 | 0.00 |
| Hydrolysis inhibitor [parts by weight] | 0.05 | 0.50 | 1.00 | 3.00 | 0.00 | 3.50 | 0.00 | 2.00 |
| Total [parts by weight] | 0.10 | 1.00 | 2.00 | 6.00 | 0.00 | 7.00 | 2.00 | 2.00 |
| <Weather resistance test> Charpy impact strength [$J/m^2$] | | | | | | | | |
| Initial value | NB | NB | NB | NB | NB | NB | NB | NB |
| 100 Hours | NB | NB | NB | NB | 37.1 | NB | NB | NB |
| 200 Hours | 55.0 | NB | NB | NB | 17.8 | NB | NB | NB |
| 300 Hours | 37.8 | NB | NB | NB | 9.6 | NB | NB | NB |
| 600 Hours | — | NB | NB | NB | — | NB | NB | 55.1 |
| 1000 Hours | — | NB | NB | NB | — | NB | 40.4 | 10.7 |
| 2000 Hours | — | 9.2 | 37.1 | 71.1 | — | 70.9 | — | — |

TABLE 5

Chemical resistance test

|  | Example 11 | Example A12 | Example A13 | Reference Example A3 |
|---|---|---|---|---|
| <Raw materials> | | | | |
| CPE Addition ratio [% by weight] | 70 | 70 | 70 | 70 |
| PC Component ratio [% by weight] | 30 | 30 | 30 | 30 |
| Types of PC | PC1 | PC2 | PC3 | PC4 |
| MFR of PC [g/10 min] (300° C., 1.2 kg) | 4 | 5.3 | 10 | 15 |
| Melt viscosity ratio (280° C., 10/sec) | 4.90 | 3.40 | 2.10 | 1.80 |
| <Chemical resistance test> | | | | |
| 1. Ammonia water | | | | |
| Change in appearance | No problem | No problem | No problem | Break, cloudiness |
| Tensile strength retention ratio | 89.5 | 84.3 | 76.4 | 0.0 |
| Evaluation | ○ | ○ | ○ | X |
| 2. Sodium hydroxide 10% | | | | |
| Change in appearance | No problem | No problem | No problem | No problem |
| Tensile strength retention ratio | 25.1 | 23.7 | 20.1 | 10.9 |
| Evaluation | Δ | X | X | X |
| 3. Nitric acid 40% | | | | |
| Change in appearance | No problem | No problem | No problem | Yellowing |
| Tensile strength retention ratio | 105.1 | 99.7 | 84.8 | 65.3 |
| Evaluation | ◎ | ◎ | ○ | X |
| 4. Water soluble cutting oil | | | | |
| Change in appearance | No problem | No problem | No problem | No problem |
| Tensile strength retention ratio | 80.1 | 76.7 | 63.9 | 22.0 |
| Evaluation | ○ | ○ | Δ | X |
| 5. Deodorant for clothes | | | | |
| Change in appearance | No problem | No problem | No problem | No problem |
| Tensile strength retention ratio | 89.1 | 88.1 | 70.1 | 31.9 |
| Evaluation | ○ | ○ | ○ | Δ |
| <Analysis of PC ratio by FT-IR> | | | | |
| PC ratio in surface layer (0.2 mm from surface of test specimen) | 5 | 10 | 20 | 30 |

B. Helmet Impact Absorption Test Penetration Resistance Test

The components used in the following Examples are described below.

TRITAN "TX1000": poly(1,4-cyclohexylene dimethylene terephthalate) copolyester resin, TRITAN of general grade for injection, manufactured by Eastman Chemical Company. Polycarbonate "302-4": polycarbonate resin, standard grade, manufactured by Sumika Styron Polycarbonate Limited.

UV absorbing agent UV-3638: benzoxazine compound, manufactured by Cytec Company, CYASORB UV-3638 (2,2'-p-phenylene bis(3,1-benzoxazin-4-one).

Hydrolysis inhibitor LA-1: carbodiimide compound, manufactured by Nisshinbo Chemical Inc., LA-1 (poly(4,4'-methylene biscyclohexyl carbodiimide).

Titan oxide: pigment

The method for evaluating the helmet impact absorption test penetration resistance test is the same as the test method described above. The evaluation results are shown in Table 6.

Example B1

A resin composition further containing 0.5 parts by weight of a UV absorbing agent UV-3638, 0.5 parts by weight of hydrolysis inhibitor LA-1, and 2 parts by weight of titan oxide as a pigment to 80% by weight of TRITAN "TX1000" and 20% by weight of polycarbonate "302-4" (100 parts by weight in total) was prepared. An industrial helmet shell was prepared by injection molding of the resin composition (hereinbelow, it is also referred to as a "shell"). By using the shell, a test for an industrial helmet of MP type (SC-MPC RA, manufactured by Midori Anzen Co., Ltd.) was performed. In Table 6, it is shown that all of the eight types had a test result of "Pass."

Example B2

A resin composition further containing 0.5 parts by weight of a UV absorbing agent UV-3638 and 0.5 parts by weight of hydrolysis inhibitor LA-1 to 80% by weight of TRITAN "TX1000" and 20% by weight of polycarbonate "302-4" (100 parts by weight in total) was prepared. A transparent visor was prepared by injection molding of the resin composition.

A resin composition further containing 0.5 parts by weight of a UV absorbing agent UV-3638, 0.5 parts by weight of hydrolysis inhibitor LA-1, and 2 parts by weight of titan oxide as a pigment to 80% by weight of TRITAN "TX1000" and 20% by weight of polycarbonate "302-4"

(100 parts by weight in total) was prepared. A shell was prepared by injection molding of the resin composition.

The aforementioned transparent visor was installed in the shell by insert molding. By using the shell, the test for a western type industrial helmet added with clear visor (SC-11PCL RA) was performed. In Table 6, it is shown that all of the eight types had a test result of "Pass."

Example B3

A resin composition further containing 0.5 parts by weight of a UV absorbing agent UV-3638 and 0.5 parts by weight of hydrolysis inhibitor LA-1 to 80% by weight of TRITAN "TX1000" and 20% by weight of polycarbonate "302-4" (100 parts by weight in total) was prepared. A transparent visor was prepared by injection molding of the resin composition.

Next, a resin composition further containing 0.5 parts by weight of a UV absorbing agent UV-3638, 0.5 parts by weight of hydrolysis inhibitor LA-1, and 2 parts by weight of titan oxide as a pigment to 80% by weight of TRITAN "TX1000" and 20% by weight of polycarbonate "302-4" (100 parts by weight in total) was prepared. A shell was prepared by injection molding of the resin composition.

The aforementioned transparent visor was installed in the shell by insert molding. By using the shell, the test for an industrial helmet with built-in shield surface (SC-15PCLVS RA KP) was performed. In Table 6, it is shown that all of the eight types had a test result of "Pass."

Comparative Example B1

A resin composition further containing 0.5 parts by weight of a UV absorbing agent UV-3638, 0.5 parts by weight of hydrolysis inhibitor LA-1, and 2 parts by weight of titan oxide as a pigment to 100 parts by weight of TRITAN "TX1000" was prepared. A shell was prepared by injection molding of the resin composition. By using the shell, a test for an industrial helmet of MP type (SC-MPC RA, manufactured by Midori Anzen Co., Ltd.) was performed. According to the helmet impact absorption test after exposing to low temperature: for use against flying/dropping and the helmet impact absorption test after exposing to low temperature: for protection at falling in Table 6, the shell was significantly damaged at falling, and therefore had a test result of "Fail."

As shown in Table 6, the industrial helmet using an industrial helmet shell of each Example, which has been produced with a resin composition containing 80% by weight of TRITAN "TX1000" and 20% by weight of polycarbonate "302-4" as a main component, had "Pass" for all test items regardless of its shape. Based on this, it can be said that an industrial helmet having the pass performance according to the standard determination of Labor Safety and Hygiene Act can be produced with the resin composition of the present invention.

On the contrary, the industrial helmet using an industrial helmet shell of Comparative Example, which has been produced with a resin composition 100 parts by weight of TRITAN "TX1000" as a main component, had "Fail" for the helmet impact absorption test after exposing to low temperature: for use against flying/dropping and the helmet impact absorption test after exposing to low temperature: for protection at falling. Based on this, it can be said that it is not possible to produce an industrial helmet having the pass performance according to the standard determination of Labor Safety and Hygiene Act with the resin composition of Comparative Example.

TABLE 6

Helmet impact absorption test · penetrator resistance test

| | | Example B1 | Example B2 | Example B3 | Comparative Example B1 |
|---|---|---|---|---|---|
| <Types of helmet> | | Industrial helmet of MP type | Western type industrial helmet added with clear visor | Industrial helmet with built-in shield surface | Industrial helmet of MP type |
| <Shell> | | | | | |
| TRITAN addition ratio [% by weight] | | 80 | 80 | 80 | 100 |
| PC Component ratio [% by weight] | | 20 | 20 | 20 | 0 |
| UV absorbing agent [parts by weight] | | 0.5 | 0.5 | 0.5 | 0.5 |
| Hydrolysis inhibitor [parts by weight] | | 0.5 | 0.5 | 0.5 | 0.5 |
| Pigment [parts by weight] | | 2.0 | 2.0 | 2.0 | 2.0 |
| <Transparent visor> | | | | | |
| TRITAN addition ratio [% by weight] | | — | 80 | 80 | — |
| PC Component ratio [% by weight] | | — | 20 | 20 | — |
| UV absorbing agent [parts by weight] | | — | 0.5 | 0.5 | — |
| Hydrolysis inhibitor [parts by weight] | | — | 0.5 | 0.5 | — |
| <Helmet impact absorption test> | | | | | |
| Exposure condition for use against flying/dropping | High temperature | Pass | Pass | Pass | Pass |
| | Low temperature | Pass | Pass | Pass | Fail |
| | Impregnation in water | Pass | Pass | Pass | Pass |

TABLE 6-continued

Helmet impact absorption test · penetrator resistance test

|  |  | Example B1 | Example B2 | Example B3 | Comparative Example B1 |
|---|---|---|---|---|---|
| <Helmet impact absorption test> | | | | | |
| Exposure condition for protection at falling | High temperature | Pass | Pass | Pass | Pass |
|  | Low temperature | Pass | Pass | Pass | Fail |
|  | Impregnation in water | Pass | Pass | Pass | Pass |
| <Helmet penetration resistance test> | | | | | |
| For use against flying/dropping | | Pass | Pass | Pass | Pass |
| <Helmet penetration resistance test> | | | | | |
| For protection at falling | | Pass | Pass | Pass | Pass |

INDUSTRIAL APPLICABILITY

A resin composition having better properties than a poly (1,4-cyclohexylene dimethylene terephthalate) copolyester resin can be obtained by performing polymer alloying by using a poly(1,4-cyclohexylene dimethylene terephthalate) copolyester resin which is excellent material, more specifically a copolyester resin containing dimethyl terephthalate (DMT) as an acid component and 1,4-cyclohexane dimethanol (CHDM) and 2,2,4,4-tetramethyl-cyclobutan diol (TMCD) as a glycol component, with a polycarbonate resin. With the application thereof, development of a more effective material can be achieved.

The invention claimed is:

1. An injection molded body formed of a resin composition comprising a mixture of a poly (1,4-cyclohexylene dimethylene terephthalate) copolyester resin and a polycarbonate resin, wherein the poly (1,4-cyclohexylene dimethylene terephthalate) copolyester resin is contained at 60% by weight to 95% by weight and the polycarbonate resin is contained at 5% by weight to 40% by weight, and the poly(1,4-cyclohexylene dimethylene terephthalate) copolyester resin contains an acid component selected from terephthalic acid and derivatives thereof, and a glycol component consisting essentially of 1,4-cyclohexane dimethanol (CHDM) and 2,2,4,4-tetramethyl-cyclobutan diol (TMCD), and a melt viscosity ratio of polycarbonate resin to melt viscosity of poly(1,4-cyclohexylene dimethylene terephthalate) copolyester resin is 2.0 or more at 280° C. and a shear rate of 10 (sec-1), and a MFR value at 300° C., 1.2 kg of the polycarbonate resin is less than 15 g/10 min, wherein a content of the poly (1,4-cyclohexylene dimethylene terephthalate) copolyester resin per the polycarbonate resin is higher in a surface layer than an average value of the molded body as a whole.

2. The injection molded body according to claim 1, the resin composition further comprising a UV absorbing agent and/or a hydrolysis inhibitor, wherein the total of the UV absorbing agent and the hydrolysis inhibitor is 0.1 to 6.0 parts by weight per 100 parts by weight of the poly (1,4-cyclohexylene dimethylene terephthalate) copolyester resin and the polycarbonate resin in total.

* * * * *